(12) United States Patent
Yu et al.

(10) Patent No.: US 12,015,198 B2
(45) Date of Patent: Jun. 18, 2024

(54) ANTENNA UNIT AND MANUFACTURING METHOD THEREOF, DISPLAY DEVICE, AND ELECTRONIC APPARATUS

(71) Applicant: BOE TECHNOLOGY GROUP CO., LTD., Beijing (CN)

(72) Inventors: Hai Yu, Beijing (CN); Yafei Zhang, Beijing (CN); Yang Zheng, Beijing (CN); Yanzhao Li, Beijing (CN); Feng Qu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 378 days.

(21) Appl. No.: 17/289,542

(22) PCT Filed: Jan. 21, 2021

(86) PCT No.: PCT/CN2021/073030
§ 371 (c)(1),
(2) Date: Apr. 28, 2021

(87) PCT Pub. No.: WO2021/147945
PCT Pub. Date: Jul. 29, 2021

(65) Prior Publication Data
US 2022/0276682 A1    Sep. 1, 2022

(30) Foreign Application Priority Data

Jan. 22, 2020  (WO) ............... PCT/CN2020/073931
Apr. 30, 2020  (CN) ......................... 202010370108.5

(51) Int. Cl.
*H01Q 21/24*    (2006.01)
*G02F 1/1333*   (2006.01)
(Continued)

(52) U.S. Cl.
CPC ......... *H01Q 1/38* (2013.01); *G02F 1/133305* (2013.01); *G02F 1/13338* (2013.01);
(Continued)

(58) Field of Classification Search
CPC ........ H01Q 1/243; H01Q 21/28; H01Q 1/521; H01Q 9/42; H01Q 1/38; H01Q 9/0414;
(Continued)

(56) References Cited

U.S. PATENT DOCUMENTS 7,557,890 B2   7/2009  Sakama et al.
9,728,840 B2   8/2017  Shi et al.
(Continued)

FOREIGN PATENT DOCUMENTS

CN    1734318 A    2/2006
CN    102931199 A   2/2013
(Continued)

OTHER PUBLICATIONS

Extended European Search Report dated Jan. 31, 2024 received in European Patent Application No. EP 21712702.6.

*Primary Examiner* — Linh V Nguyen
(74) *Attorney, Agent, or Firm* — Scully, Scott, Murphy & Presser, P.C.

(57) ABSTRACT

An antenna unit, a manufacturing method thereof, a display device, and an electronic apparatus. The antenna unit includes a radiation main body, at least one feed line, and a plurality of grounding portions. The at least one feed line and the radiation main body are electrically connected, the radiation main body, the at least one feed line, and the plurality of grounding portions are provided in a same layer.

20 Claims, 23 Drawing Sheets

(51) Int. Cl.
*H01Q 1/22* (2006.01)
*H01Q 1/38* (2006.01)
*H01Q 9/04* (2006.01)
*H01Q 21/00* (2006.01)
*H01Q 25/00* (2006.01)

(52) U.S. Cl.
CPC .......... *H01Q 1/2266* (2013.01); *H01Q 9/045* (2013.01); *H01Q 21/0006* (2013.01); *H01Q 25/001* (2013.01)

(58) Field of Classification Search
CPC ........ H01Q 1/48; H01Q 21/065; H01Q 9/045; H01Q 21/24; H01Q 5/378; H01Q 5/371; H01Q 5/35; H01Q 21/08; H01Q 9/0435; H01Q 9/0457; H01Q 1/36; H01Q 1/523
USPC .......................................... 343/700 MS, 702
See application file for complete search history.

(56) References Cited

U.S. PATENT DOCUMENTS

| | | | |
|---|---|---|---|
| 9,793,595 B1 * | 10/2017 | Padin | H01Q 1/36 |
| 10,381,750 B2 | 8/2019 | Jung et al. | |
| 10,749,272 B2 | 8/2020 | Wu et al. | |
| 11,342,686 B2 | 5/2022 | Kim et al. | |
| 11,431,095 B2 | 8/2022 | Huh et al. | |
| 2015/0062448 A1 * | 3/2015 | S. | G06F 3/041 156/60 |
| 2019/0386400 A1 * | 12/2019 | Wu | H01Q 5/371 |
| 2021/0104582 A1 * | 4/2021 | Kim | G06F 1/1698 |
| 2021/0111490 A1 * | 4/2021 | Nguyen | H01Q 9/045 |
| 2021/0135351 A1 * | 5/2021 | Son | H01Q 1/48 |
| 2022/0037788 A1 * | 2/2022 | Pajona | H01Q 7/005 |
| 2022/0109229 A1 * | 4/2022 | Kim | H01Q 1/22 |
| 2022/0209414 A1 * | 6/2022 | Byun | H10K 59/40 |
| 2022/0263224 A1 * | 8/2022 | Kim | H01Q 5/385 |
| 2022/0285840 A1 * | 9/2022 | Lee | H01Q 1/243 |
| 2023/0006337 A1 * | 1/2023 | O'Driscoll | H01Q 1/273 |
| 2023/0199096 A1 * | 6/2023 | Yun | H01Q 21/08 455/566 |

FOREIGN PATENT DOCUMENTS

| | | | | |
|---|---|---|---|---|
| CN | 104882674 | * | 9/2015 | |
| CN | 104882674 A | | 9/2015 | |
| CN | 205247351 U | | 5/2016 | |
| CN | 109004337 A | | 12/2018 | |
| CN | 109411873 | * | 3/2019 | |
| CN | 109411873 A | | 3/2019 | |
| EP | 2908380 A1 | | 8/2015 | |
| WO | 2019143190 A1 | | 7/2019 | |
| WO | 2019172611 A1 | | 9/2019 | |
| WO | WO-2020204613 A1 | * | 10/2020 | H01Q 1/22 |
| WO | WO-2021085919 A1 | * | 5/2021 | H01Q 1/22 |

* cited by examiner

ANTENNA UNIT AND MANUFACTURING METHOD THEREOF, DISPLAY DEVICE, AND ELECTRONIC APPARATUS

The present application claims priority of PCT Patent Application No. PCT/CN2020/073931 filed on Jan. 22, 2020 and priority of Chinese Patent Application No. 202010370108.5 filed on Apr. 30, 2020. The entire disclosure of the aforementioned applications is incorporated by reference as part of the disclosure of the present application.

TECHNICAL FIELD

Embodiments of the present disclosure relate to an antenna unit and a manufacturing method thereof, a display device, and an electronic apparatus.

BACKGROUND

With the further development of information network and gradual increase of information amount, 5G network is the first generation of wireless communication system using millimeter wave, and such a communication system can take advantage of greater bandwidth provided by millimeter wave to solve the problem of data path congestion. 5G network communication system has the characteristics of ultra-large capacity and extremely high transmission rate, and is an important communication mode in the future. Millimeter wave, that is, electromagnetic wave with wavelength between 1 mm and 10 mm, usually corresponds to radio spectrum between 30 GHz and 300 GHz. This part of spectrum has continuously available bandwidth, which can meet the transmission needs of 5G network.

In recent years, with the development of wireless communication technology, the requirement for antenna design of electronic apparatus is getting higher and higher. Antennas such as microstrip antenna, microstrip slot antenna, and planar antenna in an inverted F shape are usually arranged at the rear surface of electronic apparatus. Due to the influence of the internal structure of electronic apparatus, the signal strength received at the front surface of electronic apparatus is weak, thus affecting communication quality.

SUMMARY

At least one embodiment of the present disclosure provides an antenna unit, and the antenna unit includes a radiation main body, at least one feed line, and a plurality of grounding portions. The at least one feed line is electrically connected with the radiation main body, and the radiation main body, the at least one feed line, and the plurality of grounding portions are provided in a same layer.

For example, in the antenna unit provided by at least one embodiment of the present disclosure, the at least one feed line includes a first feed line and a second feed line, and the antenna unit comprises a dual-polarized antenna, the first feed line is located at a first side of the radiation main body and electrically connected with the radiation main body, and the second feed line is located at a second side of the radiation main body and electrically connected with the radiation main body, and the plurality of grounding portions include a first grounding portion, a second grounding portion, a third grounding portion, and a fourth grounding portion, wherein the first grounding portion and the second grounding portion are respectively located at both sides of the first feed line, and the third grounding portion and the fourth grounding portion are respectively located at both sides of the second feed line.

For example, in the antenna unit provided by at least one embodiment of the present disclosure, the second grounding portion and the third grounding portion are electrically connected.

For example, in the antenna unit provided by at least one embodiment of the present disclosure, the first feed line includes a first section and a second section, the first section is close to the radiation main body, and the second section is electrically connected with the first section, the first section is electrically connected with the radiation main body, and the second section extends from the first section between the first grounding portion and the second grounding portion; the second feed line includes a third section and a fourth section, the third section is close to the radiation main body, and the fourth section is electrically connected with the third section, the third section is electrically connected with the radiation main body, and the fourth section extends from the third section between the third grounding portion and the fourth grounding portion, and the radiation main body has a symmetrical contour, the first section and the third section are symmetrical with respect to a symmetry axis of the radiation main body, and the symmetry axis of the radiation main body is a diagonal line led out from an included angle formed by the first side and the second side of the radiation main body.

For example, in the antenna unit provided by at least one embodiment of the present disclosure, the radiation main body has a square contour.

For example, in the antenna unit provided by at least one embodiment of the present disclosure, the first grounding portion, the second grounding portion, the third grounding portion, and the fourth grounding portion are arranged along a reference direction, the symmetry axis of the radiation main body is perpendicular to the reference direction, at least one selected from the group consisting of the first section and the third section is perpendicular to the symmetry axis of the radiation main body, and at least one selected from the group consisting of the second section and the fourth section is perpendicular to the reference direction.

For example, in the antenna unit provided by at least one embodiment of the present disclosure, the first grounding portion, the second grounding portion, the third grounding portion, and the fourth grounding portion are arranged along a reference direction, the symmetry axis of the radiation main body is at a first preset angel with respect to the reference direction, the first preset angle is in a range of (45 degrees ±δ), wherein δ is a preset deviation value, at least one selected from the group consisting of the first section and the third section is perpendicular to the symmetry axis of the radiation main body, and at least one selected from the group consisting of the second section and the fourth section is perpendicular to the reference direction.

For example, in the antenna unit provided by at least one embodiment of the present disclosure, the third grounding portion and the fourth grounding portion are arranged along a reference direction, the first grounding portion and the second grounding portion are arranged perpendicular to the reference direction, the symmetry axis of the radiation main body is at a first preset angel with respect to the reference direction, the first preset angle is in a range of (45 degrees ±δ), wherein δ is a preset deviation value, at least one of the first section and the third section is perpendicular to the symmetry axis of the radiation main body, and the second section is parallel to the reference direction, the fourth section is perpendicular to the reference direction.

For example, in the antenna unit provided by at least one embodiment of the present disclosure, a position where the third section is electrically connected with the radiation main body and a position where the first section is electrically connected with the radiation main body are symmetrical with respect to the symmetry axis of the radiation main body.

For example, in the antenna unit provided by at least one embodiment of the present disclosure, a side of the second grounding portion facing the radiation main body is provided with a first protrusion, two sides of the first protrusion opposite to the radiation main body are parallel to each other, and a side of the third grounding portion facing the radiation main body is provided with a second protrusion, two sides of the second protrusion opposite to the radiation main body are parallel to each other.

For example, in the antenna unit provided by at least one embodiment of the present disclosure, a length of the first feed line is greater than a length of the second feed line, the first grounding portion includes a first body and a first strip, and the first strip is located at a side of the first body facing the first feed line and extends in a direction parallel to the first feed line, and the second grounding portion includes a second body and a second strip, and the second strip is located at a side of the second body facing the first feed line and extends in a direction parallel to the first feed line.

For example, in the antenna unit provided by at least one embodiment of the present disclosure, a distance between the first strip and the first feed line is equal to a distance between the first body and the first feed line, and a distance between the second strip and the second feed line is equal to a distance between the second body and the second feed line.

For example, in the antenna unit provided by at least one embodiment of the present disclosure, a distance between the first feed line and the first grounding portion and a distance between the first feed line and the second grounding portion are equal to an integral multiple of a line width of the first feed line, and a distance between the second feed line and the third grounding portion and a distance between the second feed line and the fourth grounding portion are equal to an integral multiple of a line width of the second feed line.

For example, in the antenna unit provided by at least one embodiment of the present disclosure, a distance between the second grounding portion and the third grounding portion is greater than 0.2 mm.

For example, in the antenna unit provided by at least one embodiment of the present disclosure, the radiation main body, the first feed line, the second feed line, and the plurality of grounding portions all include metal grids.

For example, in the antenna unit provided by at least one embodiment of the present disclosure, grid lines of the metal grids are respectively parallel to corresponding contour lines of the metal grids.

For example, in the antenna unit provided by at least one embodiment of the present disclosure, grid lines of the metal grids are respectively at a second preset angle with respect to corresponding contour lines of the metal grids.

For example, in the antenna unit provided by at least one embodiment of the present disclosure, cells of the metal grids are in a square shape, a triangle shape, a diamond shape, a hexagon shape, or an octagon shape.

For example, in the antenna unit provided by at least one embodiment of the present disclosure, at least part of the radiation main body is electrically connected with the at least one feed line.

For example, in the antenna unit provided by at least one embodiment of the present disclosure, a part of the radiation main body is electrically connected with the at least one feed line, and a part of the radiation main body that is not electrically connected with the at least one feed line is coupled in signal with the part of the radiation main body that is electrically connected with the at least one feed line.

For example, in the antenna unit provided by at least one embodiment of the present disclosure, the radiation main body includes an antenna radiation portion, the at least one feed line includes a feed portion, each of the plurality of grounding portions includes a reference signal pattern portion, the feed portion is electrically connected with the antenna radiation portion to provide a signal current to the antenna radiation portion, and reference signal pattern portions are arranged at intervals with the feed portion and the antenna radiation portion, and are located at both sides of the feed portion away from the antenna radiation portion.

For example, the antenna unit provided by at least one embodiment of the present disclosure, further includes a bonding portion, wherein the bonding portion includes a signal bonding portion and a plurality of ground bonding portions, the plurality of ground bonding portions are electrically connected with each of the reference signal pattern portion, respectively, and the signal bonding portion is electrically connected with the feed portion.

For example, in the antenna unit provided by at least one embodiment of the present disclosure, a distance between the reference signal pattern portion and the antenna radiation portion is ranged from 200 microns to 300 microns, and a distance between the reference signal pattern portion and the feed portion is ranged from 250 microns to 400 microns.

For example, in the antenna unit provided by at least one embodiment of the present disclosure, a shape of the antenna radiation portion is one selected from the group consisting of a trapezoid shape, a polygon shape, a circle shape, and an ellipse shape.

For example, in the antenna unit provided by at least one embodiment of the present disclosure, the antenna radiation portion, the feed portion, and the reference signal pattern portion include a metal grid formed by a plurality of metal wires, respectively, wherein a line width of the plurality of metal wires is less than or equal to 5 microns, and a distance between the plurality of metal wires is greater than or equal to 200 microns.

For example, at least one embodiment of the present disclosure further provides a display device, and the display device includes: a display panel, an antenna layer, and a reflection layer. The antenna layer includes at least one antenna unit according to any one described above, the at least one antenna unit is provided at a display side of the display panel, and the reflection layer is provided at a non-display side of the display panel, wherein the display panel includes a liquid crystal display panel and a backlight module, the backlight module includes a metal reflection plate, and the reflection layer is the metal reflection plate; or the display panel includes an organic light-emitting diode display panel, and the reflection layer includes a metal heat-sink layer of the organic light-emitting diode display panel.

For example, the display device provided by at least one embodiment of the present disclosure further includes a cover plate, provided at a display side of the display panel, wherein the antenna layer is provided at a side of the cover plate facing the display panel and being located between the cover plate and the reflection layer.

For example, the display device provided by at least one embodiment of the present disclosure further includes: a touch control layer, provided between the antenna layer and the display panel, wherein the touch control layer is insulated from the antenna layer.

For example, in the display device provided by at least one embodiment of the present disclosure, the display panel includes a display region and a non-display region, and at least part of the at least one antenna unit is provided in the non-display region of the display panel.

For example, in the display device provided by at least one embodiment of the present disclosure, a radiation main body of the at least one of antenna unit includes an antenna radiation portion, at least one feed line of the at least one antenna unit includes a feed portion, and each of the plurality of the grounding portions of the at least one antenna unit includes a reference signal pattern portion, and the antenna radiation portion, the feed portion, and the reference signal pattern portion are provided in the display region of the display panel.

For example, in the display device provided by at least one embodiment of the present disclosure, the at least one antenna unit further includes a bonding portion, and the bonding porting is provided in the non-display region of the display panel.

For example, in the display device provided by at least one embodiment of the present disclosure, the at least one antenna unit includes a plurality of the antenna units, and at least one of four edges of the display device is provided with the at least one antenna unit, respectively.

For example, in the display device provided by at least one embodiment of the present disclosure, one of the four edges of the display device is provided with a plurality of the antenna units.

For example, in the display device provided by at least one embodiment of the present disclosure, the four edges of the display device include a first edge, a second edge opposite to the first edge, a third edge, and a fourth edge opposite to the third edge, the antenna unit includes at least one selected from the group consisting of following: a first antenna array, provided at the first edge; a second antenna array, provided at the second edge a third antenna array, provided at the third edge; and a fourth antenna array, provided at the fourth edge.

For example, in the display device provided by at least one embodiment of the present disclosure, the first antenna array, the second antenna array, the third antenna array, and the fourth antenna array each include N antenna units arranged in a 1×N array, wherein N is an integer and N≥4.

For example, in the display device provided by at least one embodiment of the present disclosure, each selected from the group consisting of the first antenna array, the second antenna array, the third antenna array, and the fourth antenna array has a symmetrical pattern, the first antenna array and the second antenna array are symmetrical with respect to a first central axis of the display device, and the third antenna array and the fourth antenna array are symmetrical with respect to a second central axis of the display device perpendicular to the first central axis.

For example, in the display device provided by at least one embodiment of the present disclosure, the at least one antenna unit includes four antenna units, and the four antenna units are located in four corner regions of the display device, respectively.

For example, the display device provided by at least one embodiment of the present disclosure further includes a flexible substrate, wherein the antenna layer being is provided on the flexible substrate.

For example, the display device provided by at least one embodiment of the present disclosure further includes a first adhesive layer, wherein the first adhesive layer being located on a side of the flexible substrate facing the cover plate.

For example, the display device provided by at least one embodiment of the present disclosure further includes a second adhesive layer, wherein the second adhesive layer is located at a side of the flexible substrate facing the reflection layer.

For example, the display device provided by at least one embodiment of the present disclosure further includes a flexible circuit board, wherein the at least one feed line of the at least one antenna unit is electrically connected with a plurality of signal transmission lines of the display panel through the flexible circuit board, respectively.

For example, at least one embodiment of the present disclosure further provides an electronic apparatus, and the electronic apparatus includes: a display panel, an antenna layer, and a reflection layer. The antenna layer includes at least one antenna unit according to any one described above, the at least one of the antenna unit is provided at a display side of the display panel, and the reflection layer is provided at a non-display side of the display panel.

For example, in the electronic apparatus provided by at least one embodiment of the present disclosure, a frequency range corresponding to a working wavelength of the antenna unit is from 26.5 GHz to 29.5 GHz or from 24.25 GHz to 27.5 GHz.

For example, in the electronic apparatus provided by at least one embodiment of the present disclosure, the display panel includes a liquid crystal panel and a backlight module, the backlight module includes a metal reflection plate, the reflection layer includes the metal reflection plate; or the display panel includes an organic light-emitting diode display panel, the reflection layer includes a metal heat-sink layer of the organic light-emitting diode display panel.

For example, in the electronic apparatus provided by at least one embodiment of the present disclosure, an orthographic projection of the at least one antenna unit on a plane of a light-emitting surface of the display panel is located within an orthographic projection of the reflection layer on the plane of the light-emitting surface of the display panel.

For example, in the electronic apparatus provided by at least one embodiment of the present disclosure, the at least one feed line of the at least one antenna unit includes a first feed line and a second feed line, and the antenna unit is a dual-polarized antenna, the first feed line is located at a first side of the radiation main body and electrically connected with the radiation main body, and the second feed line is located at a second side of the radiation main body and electrically connected with the radiation main body, and the plurality of grounding portions include a first grounding portion, a second grounding portion, a third grounding portion, and a fourth grounding portion, wherein the first grounding portion and the second grounding portion are respectively located at both sides of the first feed line, and the third grounding portion and the fourth grounding portion are respectively located at both sides of the second feed line.

For example, at least one embodiment of the present disclosure further provides a manufacturing method of an antenna unit, and the manufacturing method includes: providing a flexible substrate; forming a metal layer on the flexible substrate, and etching the metal layer to form an antenna, and forming an adhesive protection layer on a side of the antenna away from a display panel.

For example, the manufacturing method provided by at least one embodiment of the present disclosure further includes: forming a passivation protection layer between the metal layer and the adhesive protection layer.

For example, the manufacturing method provided by at least one embodiment of the present disclosure further includes: forming an antenna insulation layer on a side of the metal layer close to the display panel.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

Figure 1A:
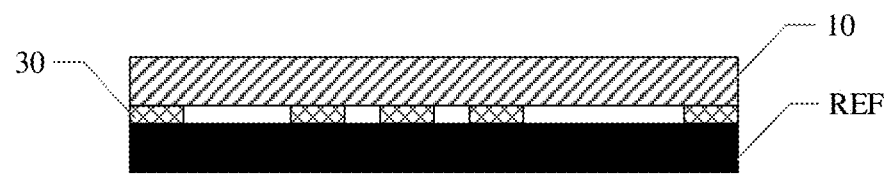
FIG. 1A illustrates a cross-sectional view of an antenna unit according to an embodiment of the present disclosure.

In order to make objectives, technical details, and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first", "second", etc., which are used in the present disclosure, are not intended to indicate any sequence, amount or importance, but distinguish various components. Similarly, similar terms such as "a", "an", or "the", etc., do not indicate the limitation of quantity, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," and the like are only used to indicate relative position relationship, and when the position of the described object is changed, the relative position relationship may be changed accordingly.

Millimeter wave brings many challenges to the realization of future 5G terminal device, and one of the main factors of the impact of millimeter wave on the terminal is antenna. The utilization of millimeter wave in 5G network is mostly concentrated in 24 GHz/28 GHz/39 GHz/60 GHz frequency bands, and lengths of corresponding antennas for these frequency bands are very short, which can reduce the space of these antennas. Up to now, in millimeter wave band, a single size of antenna can reach a millimeter level, so that in terminal devices, such as smart phone, notebook computer, tablet computer, intelligent vehicle terminal, wearable intelligent device, etc., it is possible to deploy antenna arrays. The coverage of millimeter wave will be affected due to large spatial transmission loss of millimeter wave. Most LTE (Long Term Evolution) terminals only deploy two antennas, however, in order to meet the requirement for larger coverage, the antennas covering 5G millimeter wave may be up to 8 or even more, which may form an antenna array. Terminal devices using antenna array can obtain more gain, improve antenna performance and compensate for the influence of insufficient coverage. Terminal devices can already be deployed with antennas of 2G/3G/4G, Bluetooth, WIFI, GPS (Global Positioning System), Beidou, NFC (Near Field Communication), wireless charging, and other frequency bands. On the one hand, with the use of the full screen, the clearance region of the terminal antenna is getting smaller and smaller, while the use of a metal frame and a metal rear cover also limits the deployment position of the antenna array of 5G millimeter wave.

During research, the inventors noticed that a millimeter wave antenna array may be arranged at a display panel. However, a millimeter wave antenna usually adopts the form of microstrip antenna, and this form of antenna has a narrow bandwidth and cannot meet the requirement of covering multiple frequency bands of 5G millimeter wave at the same time. In addition, structurally, it is necessary to add a layer of dielectric as a substrate at the display panel, so that the thickness of the display panel is increased. Compared with microstrip antenna, a monopole antenna with single-layer radiator has a wider working bandwidth. However, due to the omnidirectional characteristic of directional diagram, the performance of the monopole antenna in use state will be reduced.

At least one embodiment of the present disclosure provides an antenna unit, and the antenna unit includes a radiation main body, at least one feed line, and a plurality of grounding portions. The at least one feed line is electrically connected with the radiation main body, and the radiation main body, the at least one feed line, and the plurality of grounding portions are arranged in the same layer.

In the antenna unit provided by the above embodiment, the radiation main body, the at least one feed line, and the plurality of grounding portions are arranged in the same layer, and compared with conventional technology, an on-screen antenna design with simpler structure is realized.

At least one embodiment of the present disclosure also provides a display device. The display device includes a display panel, an antenna layer, and a reflection layer. The antenna layer includes the antenna unit as described above, at least one antenna unit is arranged at a display side of the display panel, and the reflection layer is arranged at a non-display side of the display panel. The display panel includes a LCD (liquid crystal display) panel and a backlight module, the backlight module includes a metal reflection plate, and the reflection layer includes the metal reflection plate. Or, the display panel includes an OLED (organic light-emitting diode) display panel, and the reflection layer is a metal heat-sink layer of the OLED display panel. Or, the display panel includes a Micro LED display panel or a Mini LED display panel, and the reflection layer includes a floating metal layer at the non-display side of the display panel.

At least one embodiment of the present disclosure also provides an electronic apparatus. The electronic apparatus includes a display panel, an antenna layer, and a reflection layer. The antenna layer includes the antenna unit as described above, and at least one antenna layer is arranged at a display side of the display panel.

For example, in some embodiments, the at least one feed line includes a first feed line and a second feed line, and the antenna unit includes a dual-polarized antenna. The first feed line is located at a first side of the radiation main body and electrically connected with the radiation main body, and the second feed line is located at a second side of the radiation main body and electrically connected with the radiation main body. The plurality of grounding portions include a first grounding portion, a second grounding portion, a third grounding portion, and a fourth grounding portion, the first grounding portion and the second grounding portion are respectively located at two sides of the first feed line, and the third grounding portion and the fourth grounding portion are respectively located at two sides of the second feed line. Embodiments of the present disclosure provide a display device, the dual-polarized antenna is arranged on the same layer in the display device, and compared with conventional technology, an on-screen antenna design with simpler structure is realized.

FIG. 1A illustrates a cross-sectional view of an antenna unit according to an embodiment of the present disclosure.

For example, as shown in FIG. 1A, the antenna unit includes a protection layer 10 and a dual-polarized antenna 30 located at one side of the protection layer 10. The dual-polarized antenna 30 may include a radiation main body, a plurality of grounding portions, and a first feed line and a second feed line extending from the radiation main body, which will be described in detail below. As shown in FIG. 1A, the radiation main body, the first feed line, the second feed line, and the plurality of grounding portions of the dual-polarized antenna 30 are arranged in the same layer. In some embodiments, as shown in FIG. 1A, the antenna unit may further include a reflection layer REF, and the reflection layer REF is located at the side of the dual-polarized antenna 30 away from the protection layer.

It should be noted that the reflection layer REF can also be regarded as being arranged in a display device which includes the antenna unit as described above.

One or more layers can be added or removed in the antenna unit as required. For example, a dielectric layer may be arranged between the dual-polarized antenna 30 and the reflection layer REF. In some embodiments, a flexible substrate may be arranged the side of the dual-polarized antenna 30 facing or away from the protection layer 10, and the flexible substrate may be fixed to the protection layer 10 by means of gluing, which will be described in further detail below.

Figure 1B:
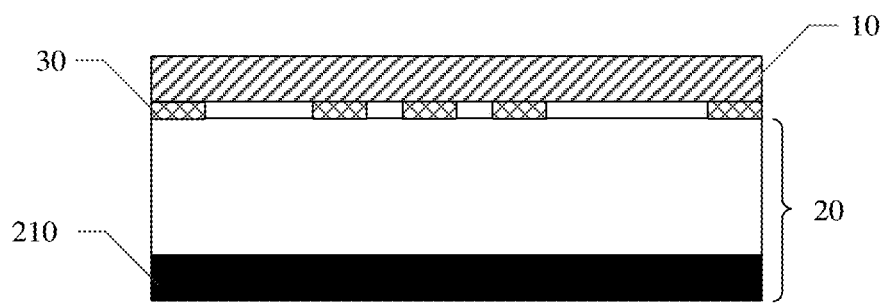
FIG. 1B illustrates a cross-sectional view of a display device according to an embodiment of the present disclosure.

FIG. 1B illustrates a cross-sectional view of a display device according to an embodiment of the present disclosure.

For example, as shown in FIG. 1B, the display device includes a display panel 20 having a conductive material layer 210 and the antenna unit as described above including the protection layer 10 (e.g., a cover plate) and the dual-polarized antenna 30. The protection layer 10 is located at a light-emitting side of the display panel 20. For example, the protection layer 10 may be realized by a cover plate of the display device. The protection layer 10 may be made of a rigid material, such as glass. In some embodiments, the protection layer 10 may be made of a flexible material, such as Colorless Polyimide (CPI), Polyethylene Terephthalate (PET), or Cyclo Olefin Polymer (COP).

For example, the conductive material layer 210 may be realized as reflection layer REF.

For example, the display panel 20 may be any suitable display panel, including but not limited to, a liquid crystal display (LCD) display panel, an organic light-emitting diode (OLED) display panel, a sub-millimeter light-emitting diode (Mini LED) display panel, a Micro LED display panel, and the like. The conductive material layer 210 may include one or more layers containing conductive material in the display panel 20, and the conductive material may be metal, metal oxide, conductive polymer, and the like. The conductive material layer 210 includes, but is not limited to, layers in which various circuits and traces made of conductive materials such as copper, ITO, and Ag, etc. are located in the display panel 20, a metal rear plate (which may be made of stainless-steel material) of the display panel 20, and the like.

For example, the dual-polarized antenna 30 may be arranged in the same layer between the protection layer 10 and the conductive material layer 210 of the display panel 20, so that the conductive material layer 210 can function as an antenna reflector. In FIG. 1B, the dual-polarized antenna 30 is located between the display panel 20 and the protection layer 10. However, embodiments of the present disclosure are not limited to this, and the dual-polarized antenna 30 can be arranged in other positions as required. For example, the dual-polarized antenna 30 is arranged inside the display panel 20, as long as the dual-polarized antenna 30 is located between the conductive material layer 210 and the protection layer 10 to make the conductive material layer 210 function as an antenna reflector. The dual-polarized antenna 30 may be made of low-resistance and low-loss metal such as copper, gold, silver, etc., may be manufactured by methods such as magnetron sputtering, thermal evaporation, electroplating, etc., and may form a patterned structure by an etching process.

Figure 2A:
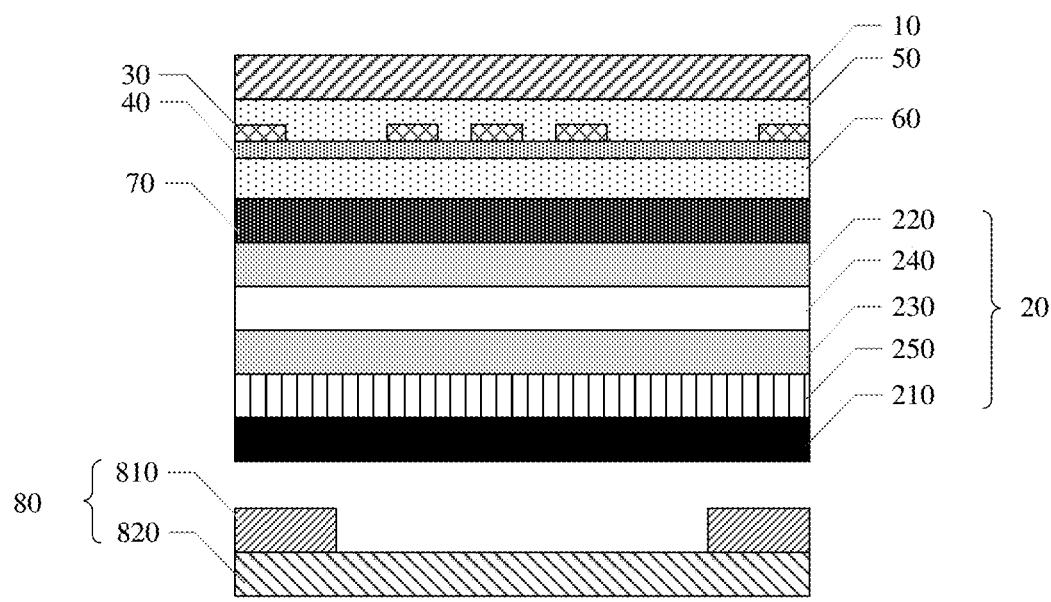
FIG. 2A illustrates a cross-sectional view of the display device according to another embodiment of the present disclosure.

FIG. 2A illustrates a cross-sectional view of a display device according to another embodiment of the present disclosure.

As shown in FIG. 2A, the display device includes a display panel 20 and an antenna unit. The antenna unit includes a protection layer 10 and a dual-polarized antenna 30. The above description of the protection layer 10, the display panel 20, and the dual-polarized antenna 30 with reference to FIG. 1A and FIG. 1B is also applicable to the display device in FIG. 2A. In FIG. 2A, the display panel 20 is an LCD display panel and includes a conductive material layer 210, a first base substrate 220, a second base substrate 230, a liquid crystal layer 240, and a backlight 250. The first base substrate 220 is disposed facing the protection layer 10, the liquid crystal layer 240 is arranged between the first base substrate 220 and the second base substrate 230, and the backlight 250 is arranged at a side of the second base substrate 230 away from the first base substrate 220. The conductive material layer 210 includes a metal plate arranged at a side of the display panel 20 away from the protection layer 10. In FIG. 2A, the metal plate is arranged at a side of the backlight 250 away from the protection layer 10, and the metal plate can function as an antenna reflector of the dual-polarized antenna 30.

In some embodiments, the display device may further include a flexible substrate 40, such as a flexible film. The dual-polarized antenna 30 may be arranged on a flexible substrate 40 to form an integral antenna structure. In FIG. 2A, the dual-polarized antenna 30 is arranged on a side of the flexible substrate 40 facing the protection layer 10. However, embodiments of the present disclosure are not limited to this, and in some embodiments, the dual-polarized antenna 30 may be disposed on a side of the flexible substrate 40 away from the protection layer 10. The flexible substrate 40 may be fixed by means of bonding.

For example, in some embodiments, a buffer layer may be arranged between the flexible substrate 40 and the dual-polarized antenna 30. For example, the material of the buffer layer may include silicon dioxide, and the thickness of the buffer layer is about 100 Å. The buffer layer is arranged to increase the bonding force between the flexible substrate 40 and the dual-polarized antenna 30.

For example, in FIG. 2A, the display device may further include a first adhesive layer 50 and/or a second adhesive layer 60. The first adhesive layer 50 is located on a side of the flexible substrate 40 facing the protection layer 10, so that the flexible substrate 40 arranged with the dual-polarized antenna 30 is adhered to the protection layer 10 through the first adhesive layer 50. The second adhesive layer 60 is located at a side of the flexible substrate 40 facing the conductive material layer 210, so that the flexible substrate 40 arranged with the dual-polarized antenna 30 may be bonded with the underlying structure (the touch control module 70 in FIG. 2A) through the second adhesive layer 60. Of course, the embodiments of the present disclosure are not limited to this, and the dual-polarized antenna 30 may also be arranged in the display device in other ways, for example, it may be etched on the protection layer 10 of the display device.

In some embodiments, the display device may include a touch control module 70. The touch control module 70 may be arranged between the dual-polarized antenna 30 and the display panel 20. However, this is only an example, and the touch control module 70 may be arranged in other positions as required, for example, the touch control module 70 may form an integrated structure with the display panel 20, which will not be described here.

A control circuit 80 of the display device (i.e., including a main board 820 and a radio frequency chip 810 arranged on the main board 820) is arranged at the rear side of the display device, that is, at a side of the display panel 20 away from the protection layer 10.

Figure 2B:
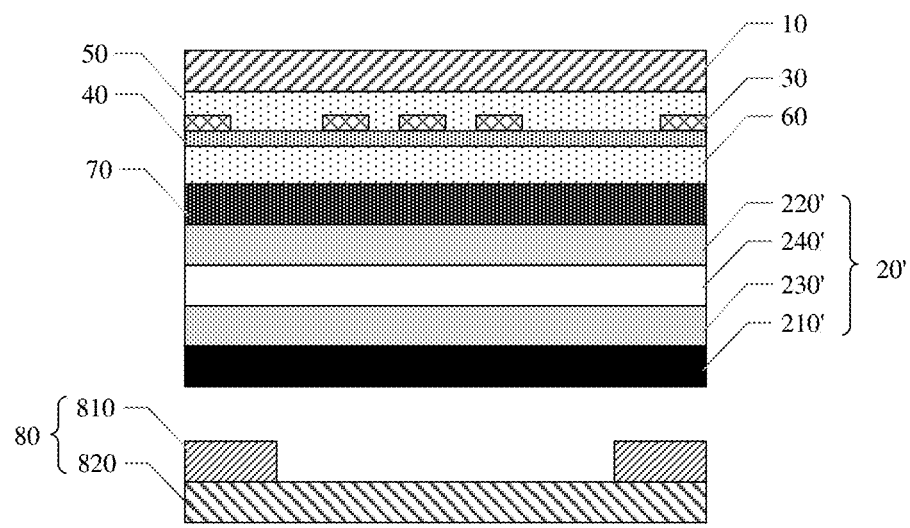
FIG. 2B illustrates a cross-sectional view of the display device according to still another embodiment of the present disclosure.

FIG. 2B illustrates a cross-sectional view of a display device according to still another embodiment of the present disclosure. The display device of FIG. 2B is similar to the display device of FIG. 2A, and the difference is at least that the display panel 20' in the display device of FIG. 2B is an OLED display panel. For the sake of clarity, the differences will be mainly described in detail below.

As shown in FIG. 2B, the display panel 20' includes a conductive material layer 210', a first base substrate 220', a second base substrate 230', and an OLED light-emitting layer 240' arranged between the first base substrate 220' and the second base substrate 230'. In FIG. 2B, the conductive material layer 210' may include a metal plate arranged at a side of the second base substrate 230' away from the protection layer 10, and the metal plate may function as an antenna reflector of the dual-polarized antenna 30.

Figure 3A:
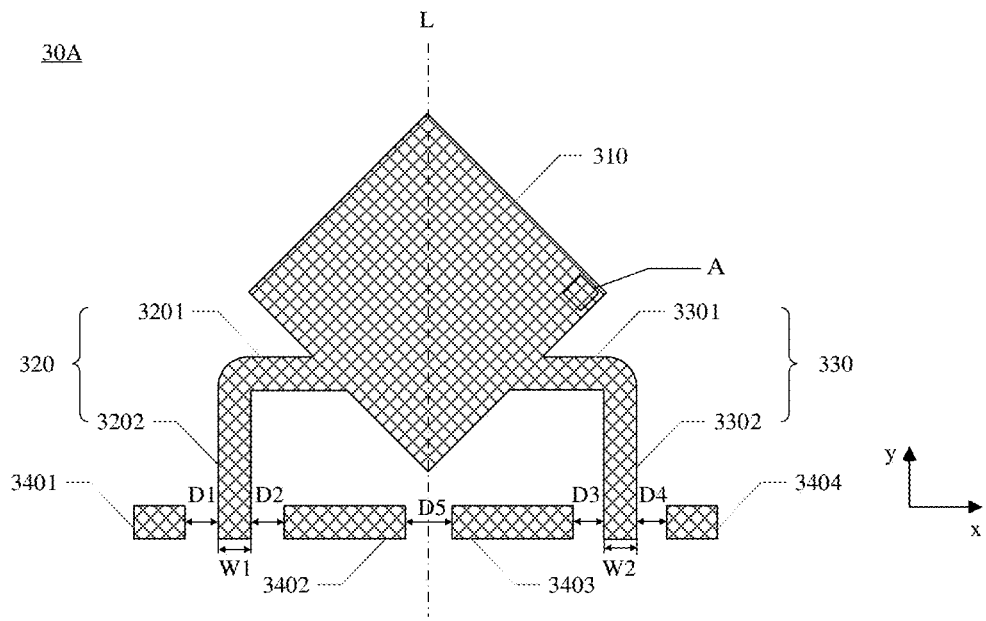
FIG. 3A illustrates a schematic structural diagram of a dual-polarized antenna according to an embodiment of the present disclosure.

FIG. 3A illustrates a structural diagram of a dual-polarized antenna according to an embodiment of the present disclosure.

As shown in FIG. 3A, the dual-polarized antenna 30A includes a radiation main body 310, at least one feed line, and a plurality of grounding portions. The at least one feed line includes a first feed line 320 and a second feed line 330. The first feed line 320 is located at a first side of the radiation main body 310 and electrically connected with the radiation main body 310, and the second feed line 330 is located at a second side of the radiation main body 310 and electrically connected with the radiation main body 310. In the example of FIG. 3A, the plurality of grounding portions include a first grounding portion 3401, a second grounding portion 3402, a third grounding portion 3403, and a fourth grounding portion 3404, which are hereinafter collectively referred to as grounding portion 340. The first grounding portion 3401 and the second grounding portion 3402 are respectively located at both sides of the first feed line 320, and the third grounding portion 3403 and the fourth grounding portion 3404 are respectively located at both sides of the second feed line 339.

For example, as shown in FIG. 3A, the radiation main body 310, the first feed line 320, the second feed line 330, and the plurality of grounding portions 340 are located on the same layer in the display device. The first feed line 320 may extend from a first side of the radiation main body 310, and the second feed line 330 may extend from a second side, adjacent to the first side, of the radiation main body 310. The first grounding portion 3401 and the second grounding portion 3402 may be respectively located at both sides of the first feed line 320, and the third grounding portion 3403 and the fourth grounding part 3404 may be respectively located at both sides of the second feed line 330. In this way, feed lines and grounding portions form a coplanar waveguide structure, for example, the first grounding portion 3401 and the second grounding portion 3402 form a first coplanar waveguide with the first feed line 320 between them, and the third grounding portion 3403 and the fourth grounding portion 3404 form a second coplanar waveguide with the second feed line 330 between them. This coplanar waveguide structure makes the resonant parameters of the dual-polarized antenna adjustable and increases the bandwidth, thus improving the radiation performance of the dual-polarized antenna.

For example, as shown in FIG. 3A, the radiation main body 310 may have a symmetrical contour, and the first side and the second side of the radiation main body 310 are two adjacent sides of the symmetrical contour of the radiation main body 310. One of the two diagonal lines of the radiation main body 310 may be taken as the symmetry axis L of the radiation main body 310, as shown by the dashed-dotted line in FIG. 3A, the diagonal line led out from the included angle formed by the first side and the second side of the radiation main body 310 may be taken as the symmetry axis L. The first feed line 320 includes a first section 3201 and a second section 3202. The first section 3201 extends from the first side of the radiation main body 310 and the second section 3202 extends from the first section 3201 between the first grounding portion 3401 and the second grounding portion 3402. The second feed line 330 includes a third section 3301 and a fourth section 3302. The third section 3301 extends from the second side of the radiation main body 310 and the fourth section 3302 extends from the third section 3301 between the third grounding portion 3403 and the fourth grounding portion 3404. The first section 3201 and the third section 3301 may be symmetrical with respect to the symmetry axis of the radiation main body 310, so that the antenna structure has good symmetry and the radiation performance is improved.

For example, in some embodiments, the radiation main body 310 may has a square contour.

In FIG. 3A, x represents a preset reference direction, and y represents a direction perpendicular to the reference direction. It should be noted that the reference direction may be an arbitrary direction, and the purpose is to illustrate the shape and position relationship of the radiation main body of the dual-polarized antenna, the first feed line, the second feed line, and the plurality of grounding portions with reference to the reference direction. In practical application, the reference direction may have different physical meanings according to the position and placement direction of the dual-polarized antenna. In the embodiment of the present disclosure, the alignment direction of the third grounding portion and the fourth grounding portion may be taken as a reference direction, and the position and shape of the rest parts of the dual-polarized antenna will be described with reference to the reference direction so as to explain the structure of the dual-polarized antenna more clearly.

For example, as shown in FIG. 3A, the first grounding portion 3401, the second grounding portion 3402, the third grounding portion 3403, and the fourth grounding portion 3404 are arranged along the x direction. The symmetry axis of the radiation main body 310 is perpendicular to the x direction. The first section 3201 and the third section 3301 (e.g., at least one selected form the group consisting of the first section 3201 and the third section 3301) are perpendicular to the symmetry axis of the radiation main body 310, that is, parallel to the x direction, and the second section 3202 and the fourth section 3302 (e.g., at least one selected form the group consisting of the second section 3202 and the fourth section 3302) are perpendicular to the x direction. The first grounding portion 3401, the second grounding portion 3402, the third grounding portion 3403, and the fourth grounding portion 3404 may all have rectangular contours, and the first grounding portion 3401 and the second grounding portion 3402 extend perpendicularly to the second section 3202 of the first feed line 320, and the second grounding portion 3402 and the third grounding portion 3403 extend perpendicularly to the fourth section 3302 of the second feed line 330. The first grounding portion 3401, the second grounding portion 3402, the third grounding portion 3403, and the fourth grounding portion 3404 may have the same width, the first grounding portion 3401 and the fourth grounding portion 3404 may have the same length, and the second grounding portion 3402 and the third grounding portion 3403 may have the same length. The first section 3201 and the third section 3301 may have the same length, and the second section 3202 and the fourth section 3202 may have the same length. The length here refers to the dimension in an extending direction, and the width refers to the dimension perpendicular to the extending direction. In this way, the dual-polarized antenna with polarization direction of ±45 degrees, which has an axisymmetric pattern with respect to the symmetry axis L, is realized, thus improving the radiation performance.

For example, in some embodiments, as shown in FIG. 3A, the distance D1 between the first feed line 320 and the first grounding portion 3401 may be equal to the distance D2 between the first feed line 320 and the second grounding portion 3402. In some embodiments, D1 and D2 may be equal to an integral multiple of the line width W1 of the first feed line 320, that is, $D1=D2=K1*W1$, where K1 is an integer and $K1 \geq 1$. Similarly, the distance D3 between the second feed line 330 and the third grounding portion 3403 may be equal to the distance D4 between the second feed line 330 and the fourth grounding portion 3404. In some embodiments, D3 and D4 may be equal to an integral multiple of the line width W2 of the second feed line 330, that is, $D3=D4=K2*W2$, where K2 is an integer and $K2 \geq 1$. K1 and K2 may be equal or different. In some embodiments, $W1=W2$. In some embodiments, $D1=D2=D3=D4=W1=W2$.

For example, in some embodiments, as shown in FIG. 3A, the distance D5 between the second grounding portion 3402 and the third grounding portion 3403 may be greater than 0.2 mm so as to achieve desired electrical isolation between them. Of course, the embodiments of the present disclosure is not limited to this, and the second grounding portion 3402 and the third grounding portion 3403 may also be electrically connected with each other, which will be further described in detail below.

For example, as shown in FIG. 3A, the radiation main body 310 may be a metal grid, and the structure of the metal grid can reduce the influence of the dual-polarized antenna on the display of the display device. The size and shape of the metal grid may be designed to ensure that the light transmittance of the display device is above a preset threshold, for example, higher than 87%. Grid lines of the metal grid of the radiation main body 310 may be parallel to the contour line or at a preset angle with respect to the contour line, respectively. In FIG. 3A, the radiation main body 310 has a square contour, two parallel sides of the square are parallel to the first direction (at an angle of 135 degrees with respect to the x direction), and the other two parallel sides are parallel to the second direction (at an angle of 45 degrees with respect to the x direction). The grid lines of the radiation main body 310 include a plurality of grid lines parallel to the first direction and a plurality of grid lines parallel to the second direction. The four sides of the square contour of the radiation main body 310 are resonance sides, and the current transmitted between the two opposite resonance sides can generate resonance. under the case where the grid lines are parallel to the contour line as shown in FIG. 3A, compared with the case where the grid lines are not parallel to the contour line, the current can be transmitted along the grid lines from one resonance side of the radiation main body 310 to the opposite resonance side in the shortest path, so that the radiation generated in other directions other than the main radiation direction can be reduced, and the radiation efficiency is higher.

In some embodiments, the first feed line 320, the second feed line 330, the first grounding portion 3401, the second grounding portion 3402, the third grounding portion 3403, and the fourth grounding portion 3404 may also be metal grids, and adopt the same or different grid structure as the radiation main body 310. In FIG. 3A, the grid lines of respective metal grid of the first feed line 320, the second feed line 330, the first grounding portion 3401, the second grounding portion 3402, the third grounding portion 3403, and the fourth grounding portion 3404 are at an angle of 45 degrees with respect to the contour line. In some embodiments, the grid lines of the metal grids of the first feed line 320, the second feed line 330, the first grounding portion 3401, the second grounding portion 3402, the third grounding portion 3403, and the fourth grounding portion 3404 can be designed to be parallel to the contour line so as to have a same grid structure with the radiation main body 310 and improve the radiation performance of the antenna.

In FIG. 3A, grid lines are arranged at equal intervals to form square cells. However, the structure of the metal grids of the embodiments of the present disclosure is not limited to this, the direction and spacing of grid lines and the number, shape and size of cells can be set as required, which will be described in detail below.

Figure 3B:
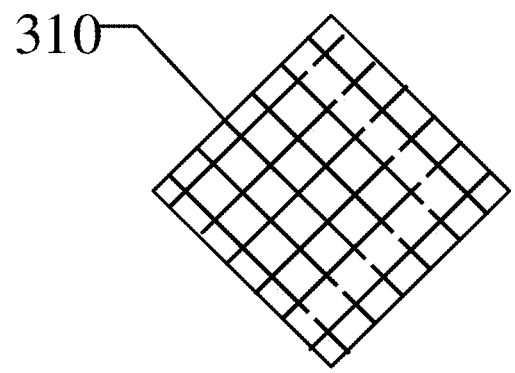
FIG. 3B illustrates an enlarged view of region A in FIG. 3A.

FIG. 3B illustrates an enlarged view of a region A in FIG. 3A.

For example, in some embodiments, at least part of the radiation main body is electrically connected with at least one feed line. As shown in FIG. 3B, the outer edge of the radiation main body 310 in the region A in FIG. 3A is disconnected from the inner part of the radiation main body 310 close to the center, so that a part of the radiation main body 310 is electrically connected with the first feed line 320 and the second feed line 330. In the way of disconnecting the grid lines in the region A as shown in FIG. 3B, the region where the radiation main body 310 is located will have no parallax, thus improving the overall visual effect.

For example, in some embodiments, as shown in FIG. 3A, the position where the third section 3301 is electrically connected with the radiation main body 310 and the position where the first section 3201 is electrically connected with the radiation main body 310 are symmetrical with respect to the symmetry axis of the radiation main body 310 so as to help the antenna unit achieve better radiation effect.

Figure 3C:
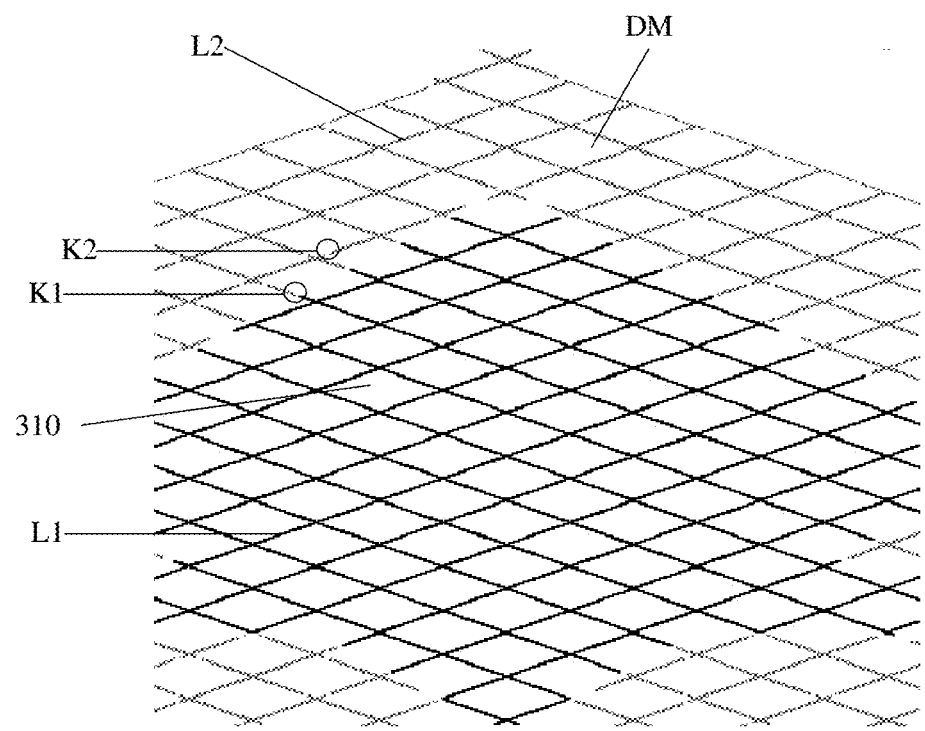
FIG. 3C illustrates a partial structural diagram of a dual-polarized antenna according to an embodiment of the present disclosure.
Figure 3D:
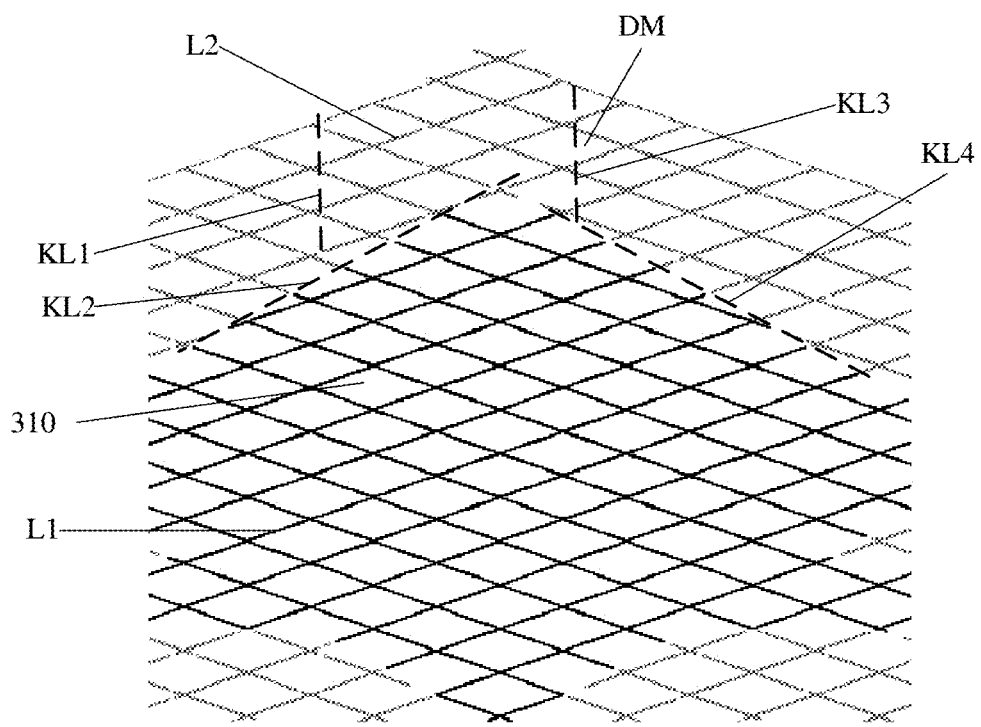
FIG. 3D illustrates a partial structural diagram of a dual-polarized antenna according to another embodiment of the present disclosure.

FIG. 3C illustrates a partial structural diagram of a dual-polarized antenna according to an embodiment of the present disclosure; FIG. 3D illustrates a partial structural diagram of a dual-polarized antenna according to another embodiment of the present disclosure.

As shown in FIG. 3C, the metal grid is arranged in the whole surface. The metal grid includes not only the part forming the dual-polarized antenna (the darker and black part in the figure) but also the part located in a redundant region DM (the part where the lines are lighter and close to gray). The metal grid in the redundant region is not involved in the radiation of the antenna. The routing direction and width of a plurality of lines L1 (black line) of radiation main body 310 of the dual-polarized antenna, are equal to the routing direction and width of a plurality of lines L2 (gray line) of redundant region DM. The plurality of lines L1 and the plurality of lines L2 are disconnected by a plurality of fractures K1, thereby cutting off the electrical signal in the plurality of lines L2 to insulate the redundant region DM from the dual-polarized antenna. For example, a plurality of fractures K1 define a region of the radiation main body 310. For example, a plurality of diamond-shaped regions are formed between the plurality of lines L1 and the plurality of lines L2. For example, the arrangement of the metal grid in the redundant region can improve the uniform optical effect of the whole surface of the display device.

For example, as shown in FIG. 3C, a plurality of fractures K2 are also arranged in the plurality of lines L2 of the redundant region. The arrangement of the plurality of fractures K2 can cut off the signal connection between the lines L2 so as to prevent parasitic capacitance between the plurality of lines L2 and other films, and further reduce the influence of the plurality of lines L2 in redundant region. Under this case, the plurality of fractures K2 can further improve the optical effect and enhance the light transmittance.

As shown in FIG. 3D, a fracture line KL1, a fracture line KL2, a fracture line KL3, and a fracture line KL4 can be obtained by connecting the plurality of fractures K1 and the plurality of fractures K2 in FIG. 3C. For example, the fracture line KL1 and the fracture line KL3 are located in the redundant region and connected by the fractures K2. That is to say, the plurality of fractures K2 are distributed at different straight lines. Selecting a part of the plurality of fractures K1 and a part of the plurality of fractures K2 in FIG. 3C to connect for descriptive explanation. Both the fracture line KL1 and the fracture line KL3 are arranged in a direction close to the longitudinal direction. However, the direction of the fracture line KL2 and the direction of the fracture line KL4 are different from the direction of the fracture line KL1 and the direction of the fracture line KL3. The influence of fractures on the display effect can be reduced by setting these uneven fracture lines so as to improve the optical visual effect of the display and the light transmittance.

It should be noted that in FIG. 3C, the fractures K1 may also be connected into a plurality of fracture lines which are not parallel to the fracture line KL1, the fracture line KL2, the fracture line KL3 and the fracture line KL4, which will not be described again.

Figure 4:
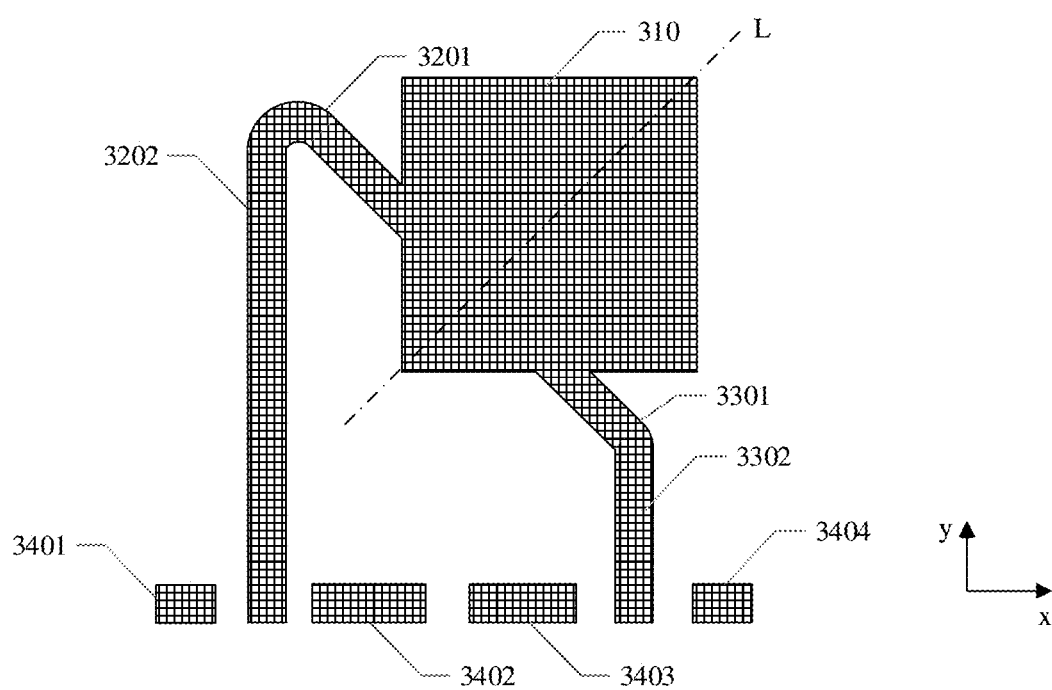
FIG. 4 illustrates a structural diagram of a dual-polarized antenna according to another embodiment of the present disclosure.

FIG. 4 illustrates a structural diagram of a dual-polarized antenna according to another embodiment of the present disclosure. The dual-polarized antenna 30B of FIG. 4 is similar to the dual-polarized antenna 30A of FIG. 3A, and the difference lies at least in the structure of the radiation main body 310, the first feed line, and the second feed line. For simplicity of description, the differences will be mainly described in detail below.

As shown in FIG. 4, the first grounding portion 3401, the second grounding portion 3402, the third grounding portion 3403, and the fourth grounding portion 3404 also have rectangular contours and are arranged along the x direction (reference direction). The radiation main body 310 also has a square contour, and the symmetry axis L of the radiation main body 310 forms a preset first angle with respect to the reference direction. The first preset angle may be 45 degrees. In some embodiments, considering the process deviation, the first preset angle may be in the range of (45 degrees ±δ), where δ is a preset deviation value. The first feed line also includes a first section 3201 and a second section 3202, and the second feed line also includes a third section 3301 and a fourth section 3302. The first section 3201 and the third section 3301 (e.g., at least one selected from the group consisting of the first section 3201 and the third section 3301) are perpendicular to the symmetry axis L of the radiation main body 310, that is, at an angle of 135 degrees with respect to the reference direction. The second section 3202 and the fourth section 3302 (e.g., at least one selected from the group consisting of the second section 3202 and the fourth section 3302) are perpendicular to the reference direction. In this way, the dual-polarized antenna with polarization directions of 0 degrees and 90 degrees is realized.

Figure 5:
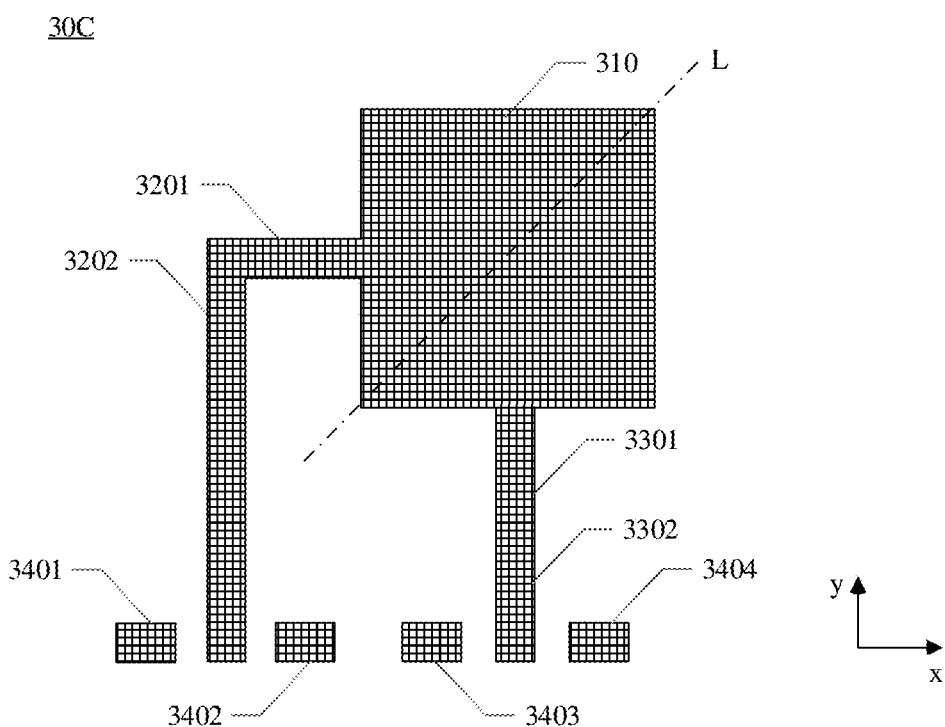
FIG. 5 illustrates a structural diagram of a dual-polarized antenna according to still another embodiment of the present disclosure.

FIG. 5 illustrates a structural diagram of a dual-polarized antenna according to still another embodiment of the present disclosure. The dual-polarized antenna 30C in FIG. 5 is similar to the dual-polarized antenna 30B of FIG. 4, and the difference lies at least in the structure of the first feed line and the second feed line. For simplicity of description, the differences will be mainly described in detail below.

Figure 6:
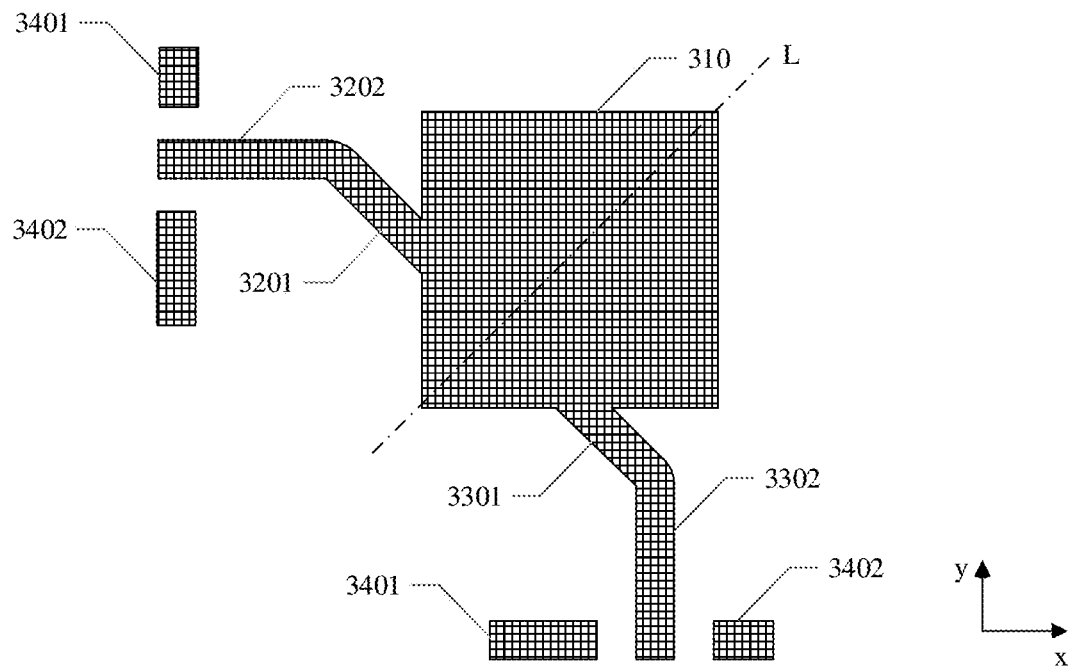
FIG. 6 illustrates a structural diagram of a dual-polarized antenna according to still another embodiment of the present disclosure.

As shown in FIG. 5, the first grounding portion 3401, the second grounding portion 3402, the third grounding portion 3403, and the fourth grounding portion 3404 also have rectangular contours and are arranged along the x direction (reference direction). The radiation main body 310 also has a square contour and an axis of symmetry L at a first preset angle with respect to the reference direction, and the first preset angle may be in the range of (45 degrees ±δ). The first feed line also includes a first section 3201 and a second section 3202, and the second feed line also includes a third section 3301 and a fourth section 3302. Different from FIG. 4, the first section 3201 of the first feed line in FIG. 5 is parallel to the reference direction, and the second section 3202 of the first feed line is perpendicular to the reference direction. The third section 3301 and the fourth section 3302 of the second feed line are perpendicular to the reference direction. In this way, another example structure of a dual-polarized antenna with polarization directions of 0 degrees and 90 degrees is realized. FIG. 6 illustrates a structural diagram of a dual-polarized antenna according to still another embodiment of the present disclosure. The dual-polarized antenna 30D of FIG. 6 is similar to the dual-polarized antenna 30B of FIG. 4, and the difference lies at least in the structure of the first feed line, the second feed line, and a plurality of grounding portions. For simplicity of description, the differences will be mainly described in detail below.

As shown in FIG. 6, the first grounding portion 3401, the second grounding portion 3402, the third grounding portion 3403, and the fourth grounding portion 3404 also have rectangular contours. Different from FIG. 4, the third grounding portion 3403 and the fourth grounding portion 3404 in FIG. 6 are arranged along the x direction (reference direction), and the first grounding portion 3401 and the second grounding portion 3402 are arranged along the y direction. The symmetry axis L of the radiation main body 310 is at a first preset angle with respect to the reference direction, and the first preset angle may be in the range of (45 degrees ±δ). The first section 3201 and the third section 3301 are perpendicular to the symmetry axis L of the radiation main body 310. The second section 3202 is parallel to the reference direction, and the fourth section 3302 is perpendicular to the reference direction. In this way, another example structure of dual-polarized antenna with polarization directions of 0 and 90 degrees is realized, and the dual-polarized antenna has an axisymmetric pattern with respect to the symmetry axis L, and has a better radiation performance.

Although the above embodiments have been described by taking four grounding portions with rectangular contour as an example, the embodiments of the present disclosure are not limited to this, which will be described with reference to FIG. 7 to FIG. 9.

Figure 7:
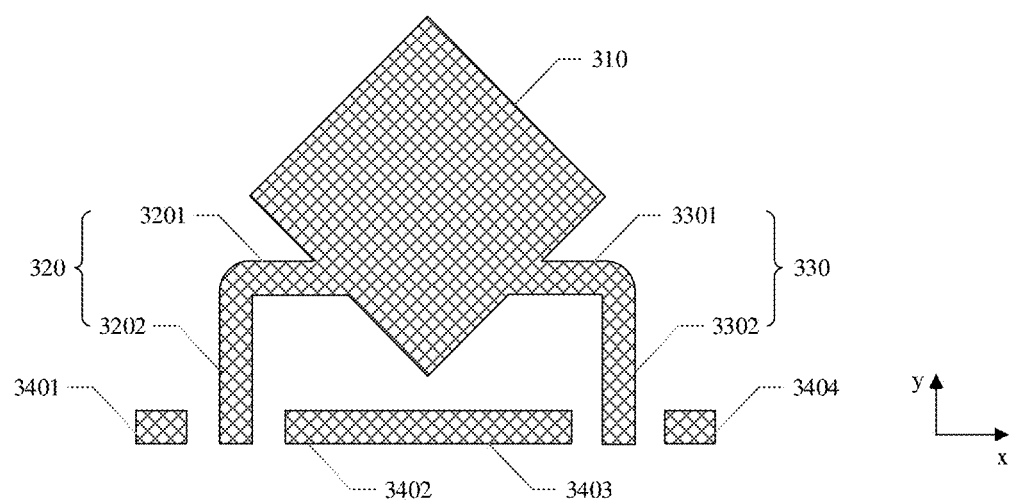
FIG. 7 illustrates a structural diagram of a dual-polarized antenna according to still another embodiment of the present disclosure.

FIG. 7 illustrates a structural diagram of a dual-polarized antenna according to still another embodiment of the present disclosure. The dual-polarized antenna 30E of FIG. 7 is similar to the dual-polarized antenna 30A of FIG. 3A, and the difference is at least that the second grounding portion and the third grounding portion are electrically connected with each other. As shown in FIG. 7, the second grounding portion 3402 and the third grounding portion 3403 are electrically connected with each other, for example, an integral rectangular conductor can be formed, so that the dual-polarized antenna has a simpler grounding structure and is easy to manufacture.

Figure 8:
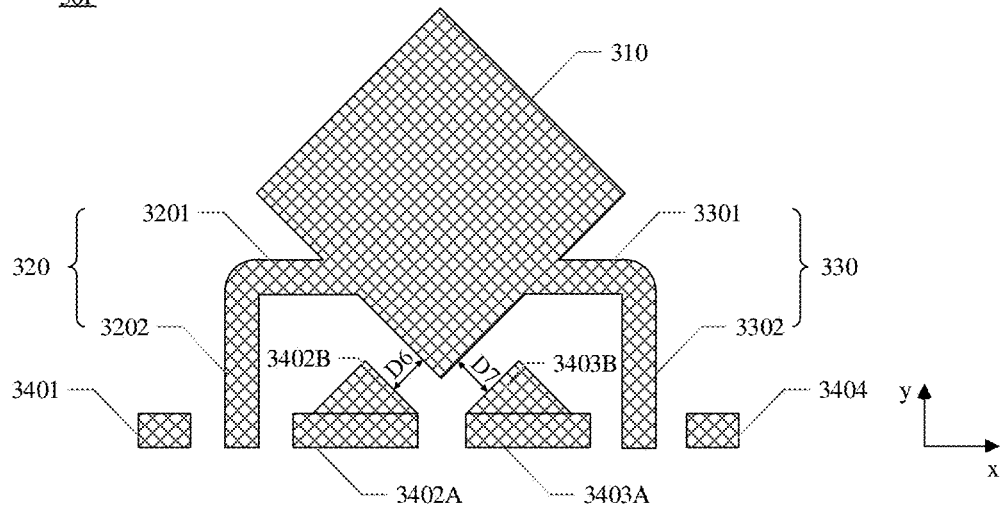
FIG. 8 illustrates a structural diagram of a dual-polarized antenna according to still another embodiment of the present disclosure.

FIG. 8 illustrates a structural diagram of a dual-polarized antenna according to still another embodiment of the present disclosure. The dual-polarized antenna 30F of FIG. 8 is similar to the dual-polarized antenna 30A of FIG. 3A, and the difference is at least that both the second grounding portion and the third grounding portion are arranged with protrusions. As shown in FIG. 8, the second grounding portion includes a second body 3402A and a triangular first protrusion 3402B. the first protrusion 3402B is arranged at one side of the second body 3402A facing the radiation main body 310, and two sides of the first protrusion 3402B opposite to the radiation main body 310 (the right side of the first protrusion 3402B and the lower left side of the radiation main body 310 in FIG. 8) are parallel to each other. The third grounding portion includes a rectangular body 3403A and a second protrusion 3403B in a triangular shape, the second protrusion 3403B is arranged at one side of the rectangular body 3403A facing the radiation main body 310, and two sides of the second protrusion 3403B opposite to the radiation main body 310 (the left side of the second protrusion 3403B and the lower right side of the radiation main body 310 in FIG. 8) are parallel to each other. A distance D6 between the first protrusion 3402B and the radiation main body 310 may be equal to a distance D7 between the second protrusion 3403B and the radiation main body 310, so that the second grounding portion and the third grounding portion are symmetrical with each other with respect to the symmetry axis of the radiation main body 310.

For example, the resonance structure of the dual-polarized antenna may be changed by setting a protrusion on the ground portion, thereby improving the S-parameter of the dual-polarized antenna. Although the first protrusion and the second protrusion in the above embodiments are both single triangles, the embodiments of the present disclosure are not limited to this, and the shape, number and size of the first protrusion and the second protrusion may be set as required, as long as at least one side thereof is adjacent and parallel to the resonance side of the radiation main body 310.

Figure 9:
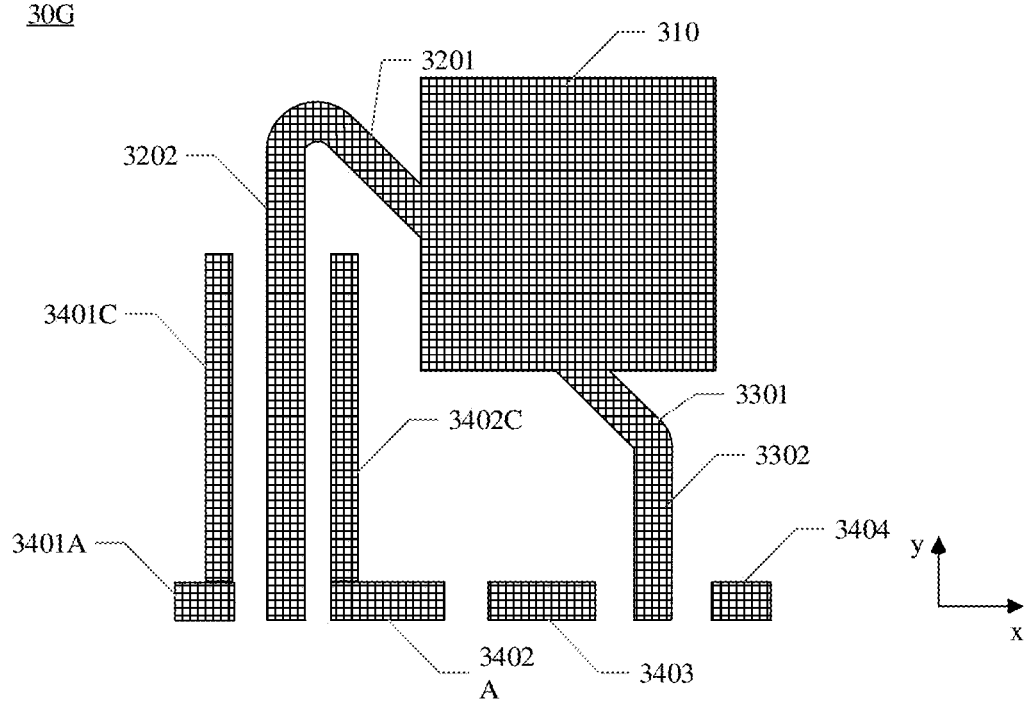
FIG. 9 illustrates a structural diagram of a dual-polarized antenna according to still another embodiment of the present disclosure.

FIG. 9 shows a structural diagram of a dual-polarized antenna according to still another embodiment of the present disclosure. The dual-polarized antenna 30F of FIG. 9 is similar to the dual-polarized antenna 30B of FIG. 4, and the difference is at least that both the first grounding portion and the second grounding portion are arranged with extension strips. As shown in FIG. 9, the first grounding portion includes a first body 3401A and a first strip 3401C. The first strip 3401C is arranged at one side of the first body 3401A facing the second section 3202 of the first feed line, and extends in a direction that is parallel to the second section 3202 of the first feed line. The second grounding portion includes a second body 3402A and a second strip 3402C. The second strip 3402C is first body 3401A one side of the second body 3402A facing the second section 3202 of the first feed line, and extends in a direction that is parallel to the second section 3202 of the first feed line. In FIG. 9, the length of the first feed line is longer than the length t of the second feed line. The radiation caused by the longer first feed line can be suppressed by arranging extension strips on the grounding portions on both sides of the longer first feed line, thereby optimizing the overall radiation performance of the antenna.

For example, in some embodiments, as shown in FIG. 9, the distance between the first strip 3401C and the first feed line is equal to the distance between the first body 3401A and the first feed line. The distance between the second strip 3402C and the second feed line is equal to the distance between the second body 3402A and the second feed line.

Although various example structures of the grounding portion have been described above with reference to FIG. 7 to FIG. 9, taking specific dual-polarization antenna structure as examples, these example structures of the grounding portion are also applicable to other dual-polarization antennas. For example, the structure of grounding portion in FIG. 7 and FIG. 8 is also applicable to the dual-polarized antenna described above with reference to FIG. 4 to FIG. 6. The structure of grounding portion in FIG. 9 is also applicable to other dual-polarized antennas with feed lines that have unequal length, such as the dual-polarized antenna 30C described above with reference to FIG. 5.

In the above embodiments, the grid lines of the metal grid of the radiation main body 310 of each dual-polarized antenna are respectively parallel to the contour line, but the embodiments of the present disclosure are not limited to this. Grid lines of the metal grid of the radiation main body 310 may also be at a second preset angle with respect to the contour line. The second preset angle can be set to any value as required to meet the needs of different designs, for example, the second preset angle can be set to any value between 0 degrees and 180 degrees.

Figure 10:
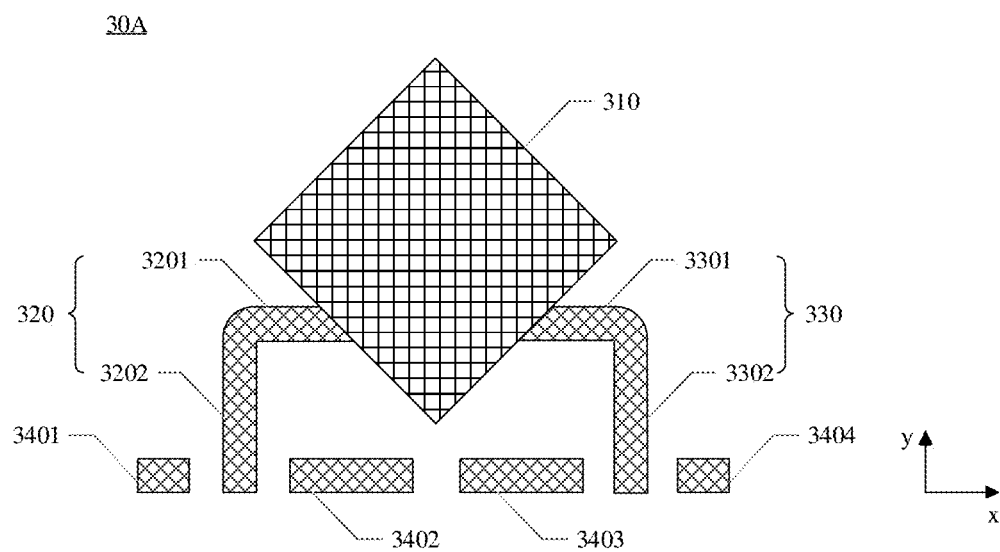
FIG. 10 illustrates a structural diagram of a dual-polarized antenna according to still another embodiment of the present disclosure.

For example, FIG. 10 illustrates a structural diagram of a dual-polarized antenna according to still another embodiment of the present disclosure. As shown in FIG. 10, the grid lines of the metal grid of the radiation main body 310 are at an angle of 45 degrees with respect to the contour line. In FIG. 10, the first feed line 320, the second feed line 330, and the grid lines of the metal grids of the first grounding portion 3401, the second grounding portion 3402, the third grounding portion 3403, and the fourth grounding portion 3404 are all at an angle of 45 degrees with respect to the contour line.

Although the metal grid has square cells in the above embodiments, the embodiments of the present disclosure are not limited to this, and the shape, size, and number of cells can be set as required. For example, the shape of the cells of the metal grid includes but are not limited to square, triangle, diamond, hexagon (e.g., regular hexagon), octagon (e.g., regular octagon), other shapes, and even irregular shapes. For example, in some embodiments, the cells of the metal grid may be dodecagon-shaped. For example, a dodecagonal cell may be formed in a cross shape.

For example, in some embodiments, at least part of the radiation main body is electrically connected with at least one feed line. For example, the radiation main body may be divided into a plurality of parts by, for example, disconnecting the grid lines of the metal grid, where different parts of the radiation main body may or may not be electrically connected with the feed line.

For example, part(s) of the radiation main body may be arranged to be electrically connected with the feed line. In some embodiments, part(s) of the radiation main body is(are) electrically connected with at least one feed line, and part(s) of the radiation main body that is(are) not electrically connected with at least one feed line is(are) coupled in signal with part(s) of the radiation main body that is(are) electrically connected to at least one feed line. For example, the divided parts of the radiation main body may also have various shapes, such as square, triangle, diamond, hexagon (e.g., regular hexagon), octagon (e.g., regular octagon), other shapes, and even irregular shapes.

A plurality of dual-polarized antennas are provided in the display device of the embodiment of the present disclosure, and the dual-polarized antennas may be distributed in the edge region of the display device, which will be described in detail with reference to FIG. 11, FIG. 12 and FIG. 13.

Figure 11:
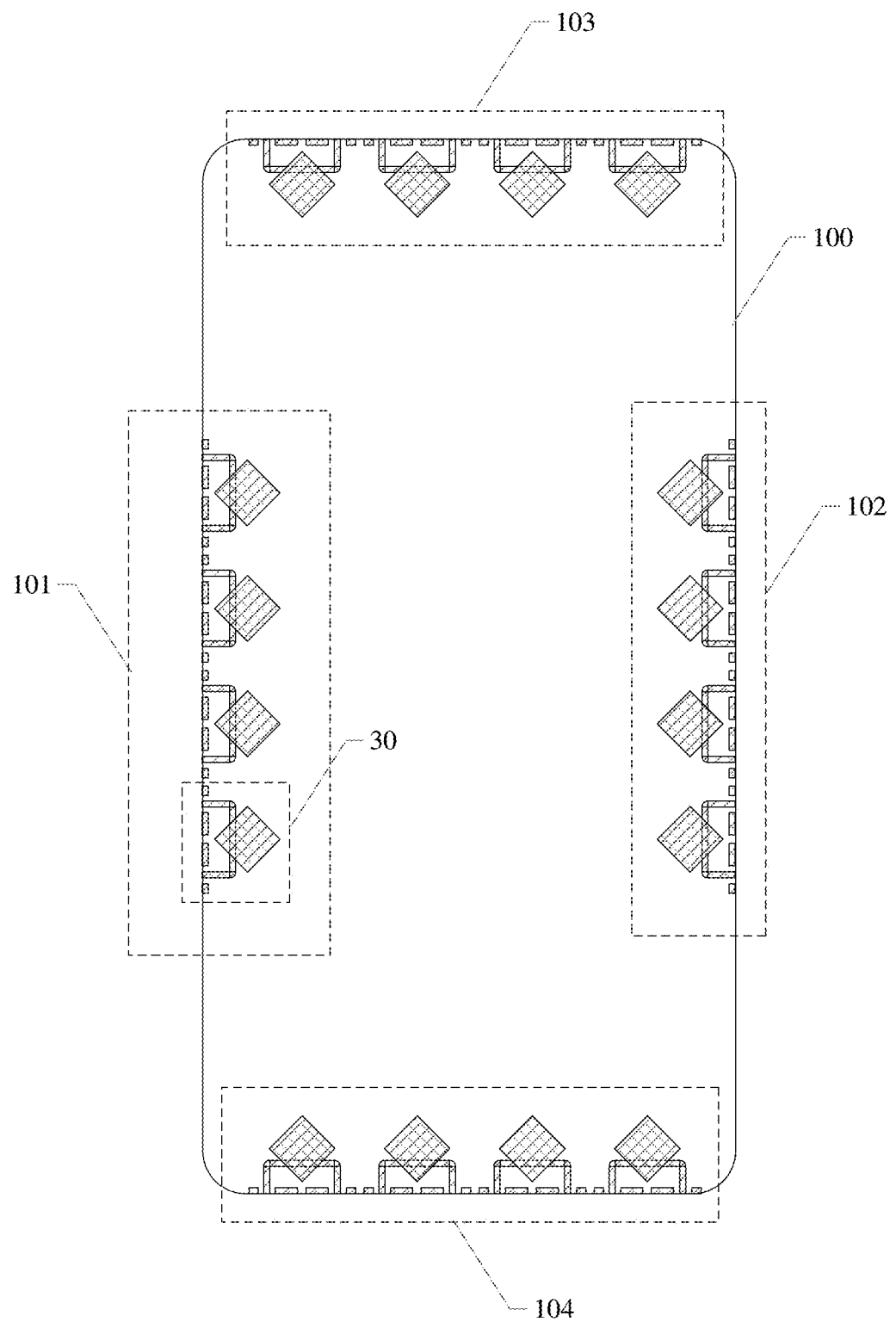
FIG. 11 illustrates a top view of a display device according to an embodiment of the present disclosure.

FIG. 11 illustrates a top view of a display device according to an embodiment of the present disclosure. As shown in FIG. 11, a display device 100 is provided with a plurality of dual-polarized antennas 30, and only one of the dual-polarized antennas is marked with a dashed block in FIG. 11 for simplicity.

For example, in some embodiments, the four edges of the display device include a first edge, a second edge opposite to the first edge, a third edge, and a fourth edge opposite to the third edge. The antenna unit includes at least one of the following: a first antenna array, a second antenna array, a third antenna array, and a fourth antenna array. The first antenna array is arranged at the first edge. The second antenna array is arranged at the second edge. The third antenna array is arranged at the third edge. The fourth antenna array is arranged at the fourth edge.

For example, as shown in FIG. 11, a plurality of dual-polarized antennas may be arranged on the display device to form at least one antenna array, such as a first dual-polarized antenna array 101 (e.g., a first antenna array), a second dual-polarized antenna array 102 (e.g., a second antenna array), a third dual-polarized antenna array 103 (e.g., a third antenna array), and a fourth dual-polarized antenna array 104 as shown in FIG. 11. The first dual-polarized antenna array 101, the second dual-polarized antenna array 102, the third dual-polarized antenna array 103, and the fourth dual-polarized antenna array 104 may be 5G millimeter wave multiple-input-multiple-output (MIMO) antenna arrays. The first dual-polarized antenna array 101 is arranged at the first edge (left edge in FIG. 11) of the display device 100. The second dual-polarized antenna array 102 is arranged at the second edge (right edge in FIG. 11) of the display device 100 opposite to the first edge. The third dual-polarized antenna array 103 is arranged at the third edge (upper edge in FIG. 11) of the display device 100. The fourth dual-polarized antenna array 104 is arranged at the fourth edge (lower edge in FIG. 11) of the display device 100 opposite to the third edge. The first dual-polarized antenna array 101, the second dual-polarized antenna array 102, the third dual-polarized antenna array 103, and the fourth dual-polarized antenna array 104 may each include a plurality of dual-polarized antennas in a 1×N array, where N is an integer and N≥4.

For example, in some embodiments, a plurality of antenna units are provided at one of the four edges of the display device. For example, an antenna array is provided at the fourth edge (lower edge in FIG. 11) of the display device, while no antenna array is provided at other edges.

For example, in FIG. 11, the first dual-polarized antenna array 101, the second dual-polarized antenna array 102, the third dual-polarized antenna array 103, and the fourth dual-polarized antenna array 104 each include four dual-polarized antennas 30 arranged along the edge where the array is located, the ends (i.e., the end located between the two grounding portions) of the two feed lines of each dual-polarized antenna 30 are arranged toward the edge of the display device 100 so as to be led out from the display device 100. However, the embodiments of the present disclosure are not limited to this, and the number and position of the dual-polarized antenna arrays and the number and arrangement of the dual-polarized antennas in the arrays can be set as required. For example, the number of dual-polarized antenna array(s) may be one, two, or five, and each dual-polarized antenna array may include 8, 16 or other number of dual-polarized antennas, and the dual-polarized antennas in each dual-polarized array may be arranged into a two-dimensional array or other array.

Although each dual-polarized antenna 30 in FIG. 11 is realized by the dual-polarized antenna described above with reference to FIG. 3A, embodiments of the present disclosure are not limited to this. The antenna layout of FIG. 11 is applicable to the dual-polarized antenna structure of any of the above embodiments. In some embodiments, the same dual-polarized antenna array may adopt the same dual-polarized antenna structure, and different dual-polarized antenna arrays may adopt different dual-polarized antenna structures.

Generally, the space for the antenna on the display device is very limited, especially for the MIMO technology of 5G millimeter wave. The dual-polarized antenna of the embodiment of the disclosure has simple structure and small size, and is suitable for antenna array design. A higher communication capacity can be realized with a smaller size of antenna in the limited space of the display device by arranging a plurality of dual-polarized antennas into an antenna array, and the dual-polarized antenna structure can be used as either a single-polarized antenna or a dual-polarized antenna.

Figure 12:
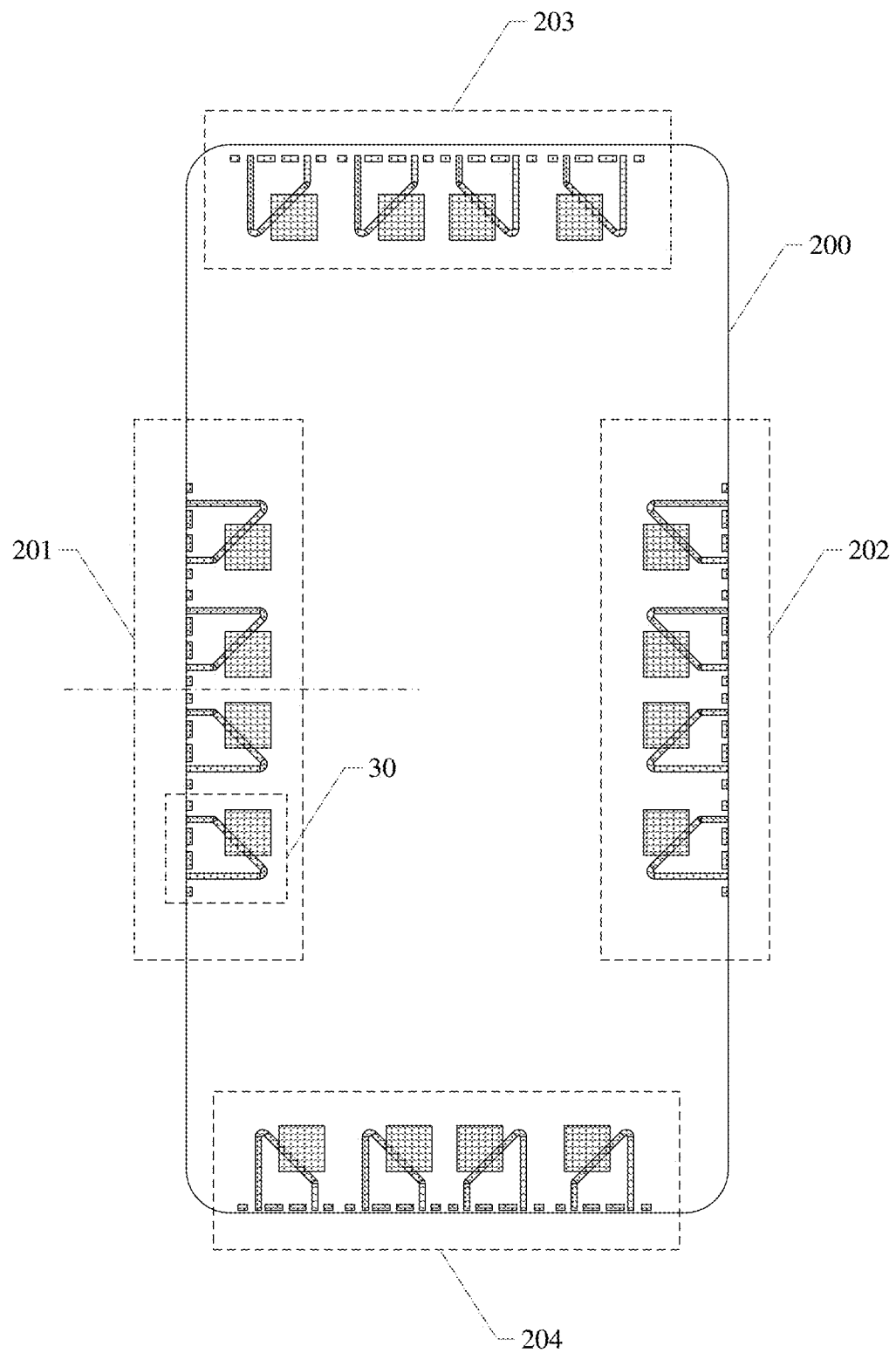
FIG. 12 illustrates a top view of a display device according to another embodiment of the present disclosure.

FIG. 12 illustrates a top view of a display device according to another embodiment of the present disclosure.

Similar to FIG. 11, the display device 200 of FIG. 12 is provided with a first dual-polarized antenna array 201, a second dual-polarized antenna array 202, a third dual-polarized antenna array 203, and a fourth dual-polarized antenna array 204, each dual-polarized antenna array includes four dual-polarized antennas 30. Different from FIG. 11, the display device 200 of FIG. 12 adopts the dual-polarized antenna structure described above with reference to FIG. 4. In FIG. 12, because the dual-polarized antennas 30 have an asymmetric structure, each dual-polarized antenna 30 may be symmetrically arranged on the display device, so that a plurality of dual-polarized antennas 30 are arranged in a symmetrical pattern as a whole.

For example, the dual-polarized antennas 30 of the first dual-polarized antenna array 201, the dual-polarized antennas 30 of the second dual-polarized antenna array 202, the dual-polarized antennas 30 of the third dual-polarized antenna array 203, and the dual-polarized antennas 30 of the fourth dual-polarized antenna array 204 may be arranged in a symmetrical pattern, respectively. Taking the first dual-polarized antenna array 201 as an example, the longer first feed line of two dual-polarized antennas 30 of the four dual-polarized antennas 30 may be arranged facing the upper edge of the display device 200, the longer first feed line of the other two dual-polarized antennas 30 may be arranged facing the lower edge of the display device 200, so that the four dual-polarized antennas 30 in the first dual-polarized antenna array 201 are arranged in an axisymmetric pattern, and the symmetry axis is shown as a dotted line. The dual-polarized antennas 30 in the second dual-polarized antenna array 202, the dual-polarized antennas 30 in the third dual-polarized antenna array 203, and the dual-polarized antennas 30 in the fourth dual-polarized antenna array 204 may be arranged in a similar manner.

For example, the first dual-polarized antenna array 201, the second dual-polarized antenna array 202, the third dual-polarized antenna array 203, and the fourth dual-polarized antenna array 204 may be arranged symmetrically to each other. As shown in FIG. 11, the first dual-polarized antenna array 201 and the second dual-polarized antenna array 202 may be symmetrical with respect to a first central axis (e.g., a vertical centerline) of the display device 200, and the third dual-polarized antenna array 203 and the fourth dual-polarized antenna array 204 may be symmetrical with respect to a second central axis (e.g., a horizontal centerline) of the display device 200, and the second central axis is perpendicular to the first central axis.

Although each dual-polarized antenna 30 in FIG. 12 is realized by the dual-polarized antenna described above with reference to FIG. 4, embodiments of the present disclosure are not limited to this. The antenna layout of FIG. 12 is applicable to the dual-polarized antenna with asymmetric pattern of any of the above embodiments, such as the dual-polarized antenna described above with reference to FIG. 5 and FIG. 9.

The embodiments of the present disclosure can improve the overall radiation performance of the antenna array by arranging the dual-polarized antennas with asymmetric structure in a symmetrical manner.

Figure 13:
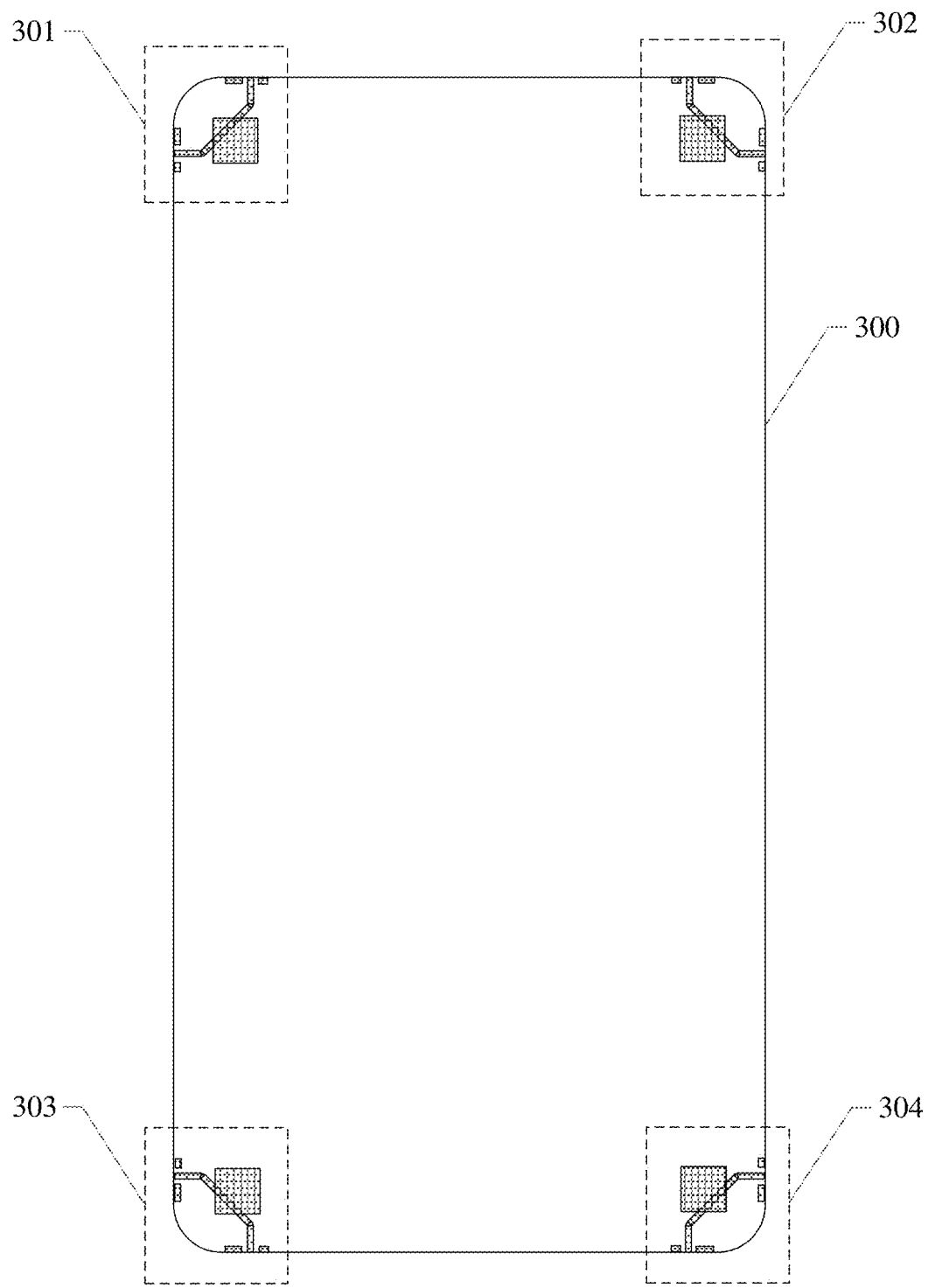
FIG. 13 illustrates a top view of a display device according to still another embodiment of the present disclosure.

FIG. 13 illustrates a top view of a display device according to still another embodiment of the present disclosure.

As shown in FIG. 13, the display device 300 includes four dual-polarized antennas such as, a dual-polarized antenna 301, a dual-polarized antenna 302, a dual-polarized antenna 303, and a dual-polarized antenna 304, which are respectively located at the upper left corner region, the upper right corner region, the lower left corner region, and the lower right corner region of the display device. The dual-polarized antenna 301, the dual-polarized antenna 302, the dual-polarized antenna 303, and the dual-polarized antenna 304 adopt the dual-polarized antenna structure described above with reference to FIG. 6, and the two feed lines of each dual-polarized antenna are located at two adjacent sides of the display device 300, respectively. For example, the first feed line of the dual-polarized antenna 301 and grounding portions at both sides of the dual-polarized antenna 301 are located at the third side (upper side) of the display device 300, and the second feed line of the dual-polarized antenna 301 and grounding portions at both sides of the dual-polarized antenna 301 are located at the first side (left side) of the display device 300. The first feed line of the dual-polarized antenna 302 and grounding portions at both sides of the dual-polarized antenna 302 are located at the second side (right side) of the display device 300, and the second feed line of the dual-polarized antenna 302 and grounding portions at both sides of the dual-polarized antenna 302 are located at the third side (upper side) of the display device 300, and so on, which will not be repeated here.

The embodiments of the present disclosure arrange four dual-polarized antennas in four corner regions of the display device, which can further reduce the occupied space of the antennas on the display device compared with the antenna array. Moreover, the two feed lines of the dual-polarized antenna in FIG. 6 extend in a direction perpendicular to each other, so that it is more suitable to be arranged in the corner regions of the display device so as to be led out from the edge of the display device.

Figure 14:
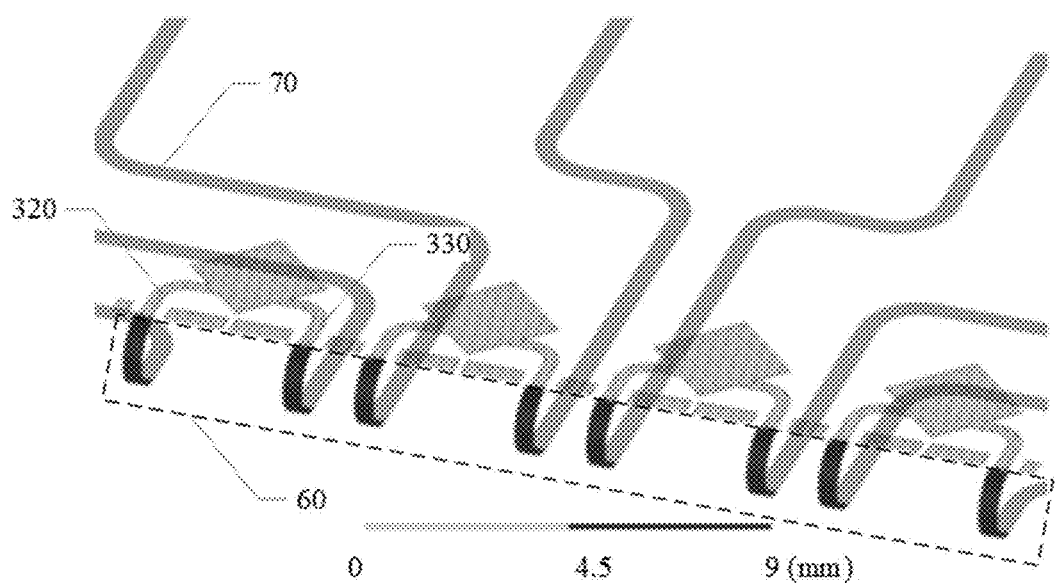
FIG. 14 illustrates a perspective view of a display device according to an embodiment of the present disclosure.

FIG. 14 illustrates a perspective view of a display device according to an embodiment of the present disclosure. In order to show the connection between the dual-polarized antenna and the signal transmission line more clearly, other layer structures of the display device are omitted in FIG. 14. As shown in FIG. 14, the display device further includes a flexible circuit board 60, such as a flexible printed circuit board (FPC). The first feed line 320 and the second feed line 330 of the dual-polarized antenna are respectively connected with a plurality of signal transmission lines 70 of the display device through the flexible circuit board 60. The plurality of signal transmission lines 70 are located at a rear side of the display device, referring to FIG. 1, at a light incident side of the display panel 20, that is, the side of the conductive material layer 210 away from the protection layer 10. The plurality of signal transmission lines 70 may be connected to a control circuit, such as a main board of a display device, so that signals provided by the control circuit are supplied to the feed lines of the dual-polarized antennas via the flexible circuit board 60. FIG. 14 only illustrates the dual-polarized antenna array located at one edge of the display device, and the first feed line and the second feed line of each of the four dual-polarized antennas in the array are connected with corresponding transmission lines 70 via conductive traces of the flexible circuit board 60. However, the number and position of the flexible circuit board 60 are not limited to this, and the feed lines of the dual-polarized antennas on other edges of the display device may be connected to corresponding signal transmission lines through additional flexible circuit board 60. For example, for the antenna layout shown in FIG. 11, four flexible circuit boards may be provided at the upper side, the lower side, the left side, and the right side of the display device 100 so as to lead out the feed lines of the four dual-polarized antenna arrays, respectively. In FIG. 14, the scale is shown at the bottom, however, this is only a schematic illustration, and is not a strict restriction on the dimensions of the elements in the figure.

Figure 15:
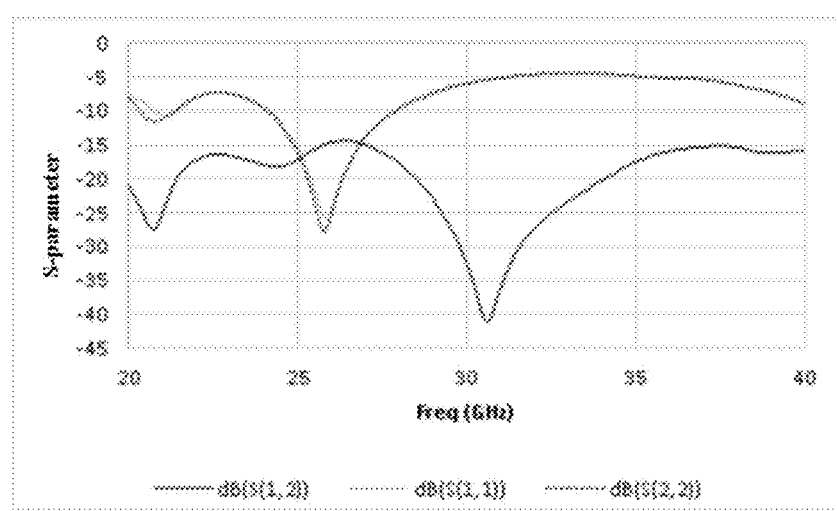
FIG. 15 illustrates a curve diagram of S-parameter of a dual-polarized antenna in a display device according to an embodiment of the present disclosure.

FIG. 15 illustrates a curve diagram of S-parameter of a dual-polarized antenna in a display device according to an embodiment of the present disclosure. As shown in FIG. 15, the S(1,1) parameter curve and the S(2,2) parameter curve of the dual-polarized antenna indicate that the −10 dB operating bandwidth of the dual-polarized antenna is at least greater than 2.5G. The S(1,1) parameter curve shows that in the range of 24 GHz-29 GHz, the port isolation of dual-polarized antenna is basically below −15 dB. Therefore, the dual-polarized antenna of the embodiment of the present disclosure has the desired port isolation in the 5G millimeter wave band.

Figure 16:
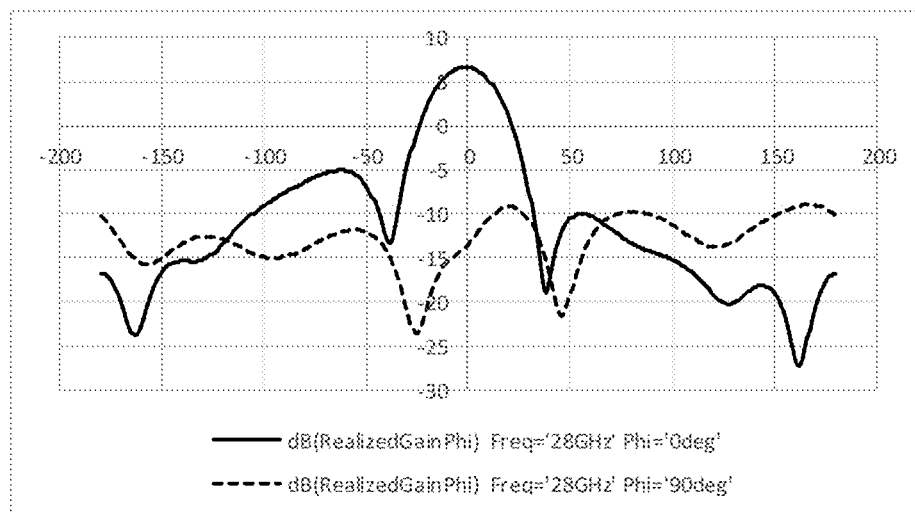
FIG. 16 illustrates a diagram of a radiation direction of a dual-polarized antenna array in a display device according to an embodiment of the present disclosure.

FIG. 16 illustrates a diagram of a radiation direction of a dual-polarized antenna array in a display device according to an embodiment of the present disclosure. Taking a 1×4 dual-polarized antenna array as an example, the two curves in FIG. 16 illustrates the gains of the two ports of the dual-polarized antenna array in all directions. under the case where the frequency is 28 GHz, the difference between the gains of the two ports in the direction of 0 degree is greater than 15 dB, that is, the polarization isolation is greater than 15 dB. The dual-polarized antenna array of the embodiments of the present disclosure can have the desired polarization isolation in the 5G millimeter wave band.

The display device according to the embodiments of the present disclosure can be implemented as various types of device, for example, the device includes but is not limited to display screen, mobile phone, television, tablet computer, notebook, desktop computer, and other device with display function.

At least one embodiment of the present disclosure also provides a display device. The display device includes a display panel, an antenna layer and a reflection layer. The antenna layer includes at least one antenna unit, the antenna layer is arranged at the display side of the display panel, and the reflection layer is arranged at the non-display side of the display panel. The display panel includes a liquid crystal panel and a backlight module, where the backlight module includes a metal reflection plate, and the reflection layer includes the metal reflection plate. Or, the display panel includes an organic light-emitting diode display panel, and the reflection layer includes a metal heat-sink layer of the organic light-emitting diode display panel.

In the display device provided by the above embodiments of the present disclosure, by using the metal reflection plate in the backlight module of the liquid crystal panel as the reflection layer or the metal heat-sink layer of the organic light-emitting diode display panel as the reflection layer, the radiation directionality of the antenna can be enhanced, so that the antenna has broadband characteristics, and meanwhile the space occupied by the antenna can be reduced, thereby improving the functional integration of the display panel without affecting the thickness of the display panel.

Some embodiments of the present disclosure also provide an electronic apparatus and a manufacturing method of the display panel of the display device.

Embodiments of the present disclosure and examples thereof will be described in detail with reference to the accompanying drawings.

Figure 17:
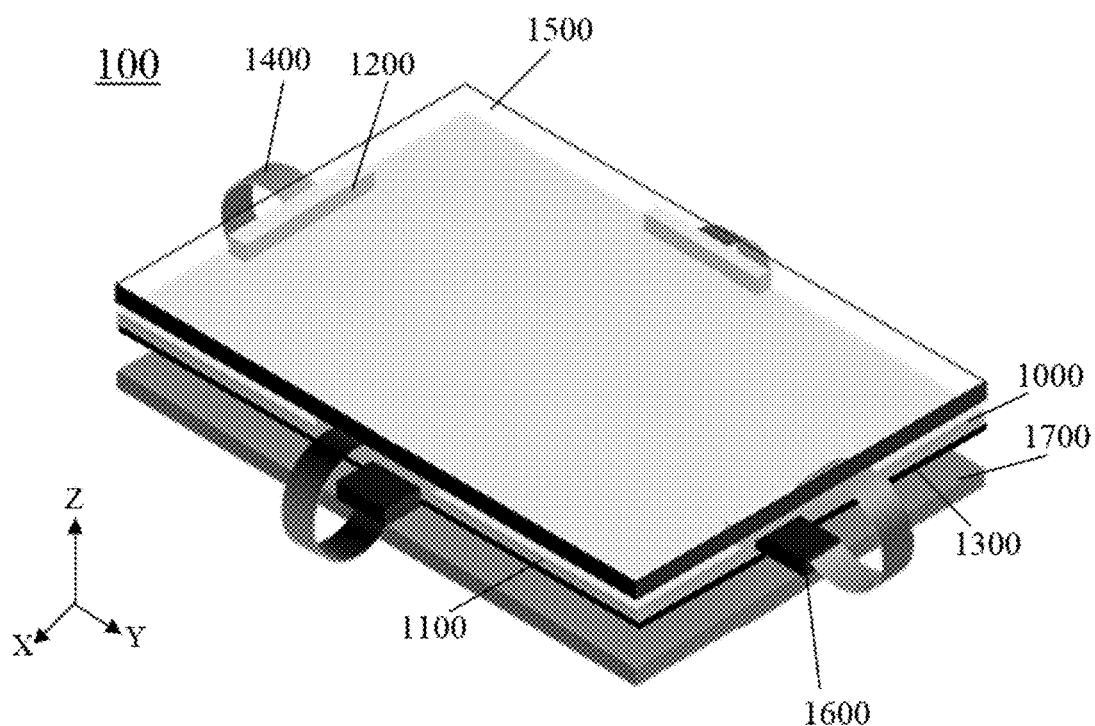
FIG. 17 illustrates a schematic structural diagram of a display device according to an embodiment of the present disclosure.
Figure 18:
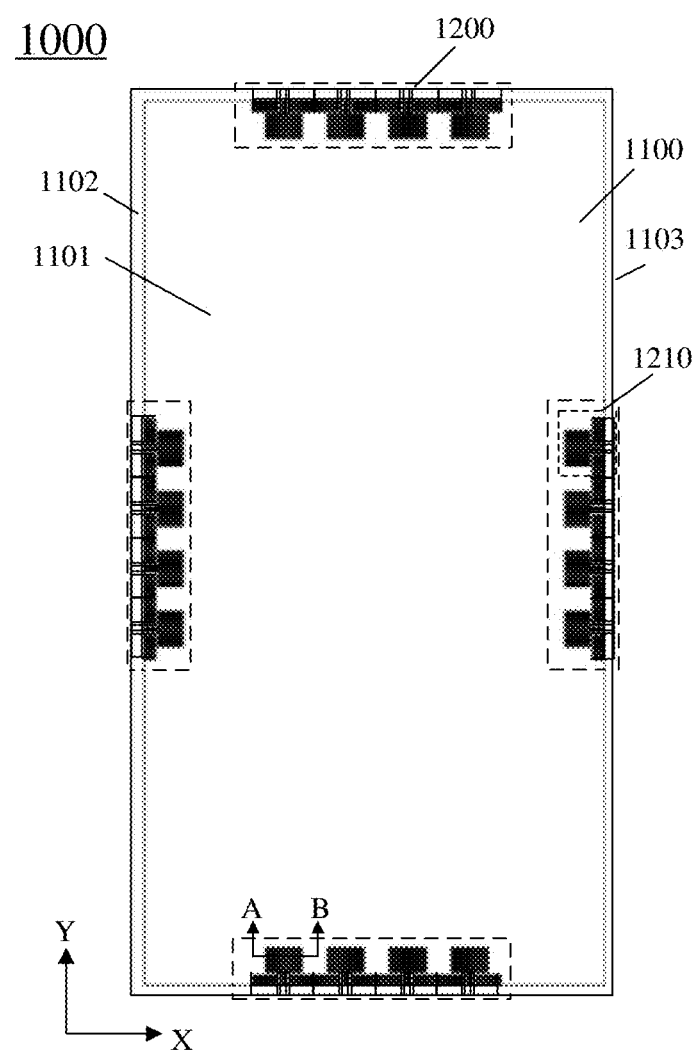
FIG. 18 illustrates a schematic diagram of a display panel according to an embodiment of the present disclosure.
Figure 19A:
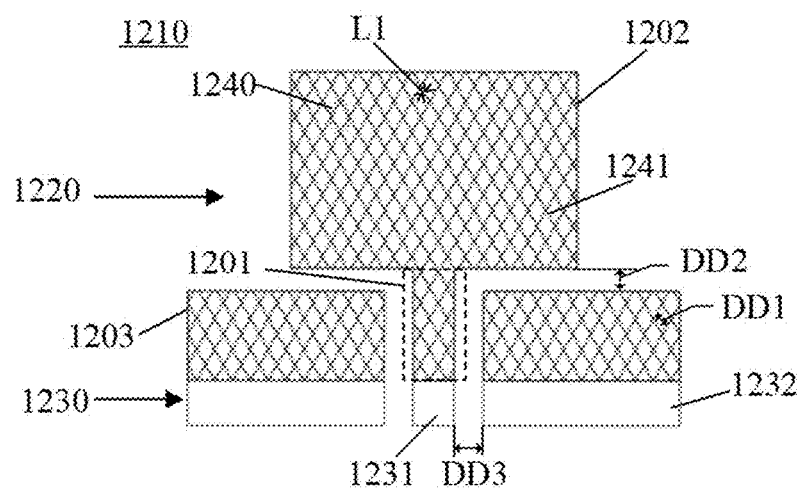
FIG. 19A illustrates a schematic diagram of an antenna unit according to an embodiment of the present disclosure.

FIG. 17 is a structural diagram of a display device according to an embodiment of the present disclosure, FIG. 18 is a schematic diagram of a display panel according to an embodiment of the present disclosure, and FIG. 19A is a schematic diagram of an antenna unit according to an embodiment of the present disclosure. The display device provided by at least one embodiment of the present disclosure will be described in detail with reference to FIG. 17, FIG. 18, and FIG. 19A.

As shown in FIG. 17 and FIG. 18, the display device includes a display panel 1000, an antenna layer 1200, and a reflection layer 1300. The display panel 1000 includes a display region 1101 and a non-display region 1102, and the non-display region 1102 at least partially surrounds the display region 1101. For example, the display panel 1000 includes a display substrate 1100.

For example, the display panel 1000 may be a liquid crystal panel, an organic light-emitting diode display panel (e.g., a rigid or flexible organic light-emitting diode display panel), a quantum dot light-emitting diode display panel, an electronic paper display panel, etc. In the following embodiments, the above-mentioned display panels will be described as examples without limitation.

For example, the display panel 1000 may include a base substrate which may be a flexible substrate or a non-flexible substrate. For example, the material of the base substrate may include organic materials, such as polyimide (Pi), polycarbonate, polyacrylate, polyetherimide, polyethersulfone, polyethylene terephthalate, polyethylene naphthalate, and other resin materials, which are not limited by the embodiments of the present disclosure.

For example, as shown in FIG. 17 and FIG. 18, the antenna layers 1200 are arranged at a first side (i.e., "a display side") of the display panel 1000 for display, and are respectively arranged along the edges 1103 of the display panel 1000. The display panel 1000 includes four edges 1103 (two edges along a X direction and two edges along a Y direction), and under the case where a plurality of antenna layers 1200 are arranged, these antenna layers 1200 may be arranged at the same edge 1103 or different edges 1103 of the display panel 1000. The extending direction (the Y direction or the X direction in the figure) of the antenna layer 1200 is parallel to the edge 1103 of the display panel 1000 where the antenna layer 1200 is located. The antenna layer 1200 is partially arranged in the non-display region 1102 of the display panel 1000, and the part of the antenna layer 1200 arranged in the non-display region 1102 of the display panel 1000 may be configured to arrange signal lines to connect with other devices, which is beneficial to the narrow frame design of the display panel 1000. The reflection layer 1300 is arranged at a second side (i.e., "non-display side"), opposite to the first side, of the display panel 1000, and is provided opposite to the antenna layer 1200 in a direction perpendicular to the display panel 1000 (a Z direction in FIG. 17, i.e., the direction of the thickness of the display panel 1000). For example, the reflection layer 1300 may be a metal reflection plate made of a metal material to enhance the radiation intensity of the antenna.

For example, the material of the reflection layer 1300 may include opaque metal materials, such as copper, gold, aluminum, and any alloy of these metal materials.

For example, the thickness of the reflection layer 1300 in the direction perpendicular to the display substrate 1100 is greater than or equal to 8 microns, to ensure the directional characteristics and intensity of antenna radiation of the antenna layer 1200.

For example, the antenna layer includes at least one antenna unit. As shown in FIG. 18, the antenna layer 1200 includes a plurality of antenna units 1210, and the antenna units 1210 are arranged side by side along the edge 1103 of the display panel 1000. At one edge 1103 of the display panel 1000, the antenna layer 1200 may include four antenna units 1210 (as shown in FIG. 18), and the antenna units 1210 are arranged in parallel without intervals to reduce occupied space. The larger the number of antenna units 1210, the greater the radiation intensity of the antenna.

For example, at least part of the at least one antenna unit 1210 is arranged in the non-display region of the display panel 1000, to reduce the space occupied by the antenna unit in the display region of the display panel, thereby reducing the influence of the antenna unit on the light transmittance of the display panel.

For example, in some embodiments, the number of antenna unit(s) 1210 in the antenna layer 1200 at one edge 1103 of the display panel 1000 may also be 1, 2, 3, 5, etc., which can be arranged according to the implementation requirement and specific structure of the terminal device. Embodiments of that present disclosure are not limited to this. For example, under the case where a plurality of antenna units 1210 are provided in the antenna layer 1200 at one edge 1103 of the display panel 1000, a certain spacing may also exist between the antenna units 1210 as long as the arrangement space allows, which is not limited by the embodiments of the present disclosure.

In the display device provided by the present embodiment, the radiation directivity of the antenna layer 1200 can be enhanced by arranging the reflection layer 1300 for the antenna unit 1210, so that the antenna radiation has broadband characteristics, and can cover a wide frequency band at the same time, and reduce the space occupied by the antenna. For example, the electromagnetic waves radiated by the antenna can cover the working frequency bands n257 (26.5 GHz-29.5 GHz) and n258 (24.25 GHz-27.5 GHz) specified by the 3GPP standard (referring to the 3rd generation mobile communication standard based on GSMMAP core network and with WCDMA as wireless interface). For example, in some examples, at least one antenna unit includes a pattern portion, the pattern portion includes a feed portion, an antenna radiation portion, and a reference signal pattern portion. The feed portion is electrically connected with the antenna radiation portion to provide a signal current to the antenna radiation portion; the reference signal pattern portion is arranged at intervals with the feed portion and the antenna radiation portion, and is located on both sides of the feed portion away from the antenna radiation portion. For example, at least one feed line of the antenna unit includes the feed portion. For example, the radiation main body is the antenna radiation portion. For example, each of the plurality of grounding portions includes the reference signal pattern portion.

For example, in some examples, at least one antenna unit further includes a bonding portion, the bonding portion is electrically connected with the pattern portion, and the bonding portion is arranged in the non-display region of the display panel.

As shown in FIG. 18 and FIG. 19A, the antenna unit 1210 includes a pattern portion 1220 and a bonding portion 1230, respectively. The pattern portion 1220 is electrically connected with the bonding portion 1230, and the bonding portion 1230 is located in the non-display region 1102 of the display panel 1000. The pattern portion 1220 is located in the same film layer as the bonding portion 1230, and is arranged at the first side of the display panel 1000 so as to reduce the occupied space and further contribute to reducing the thickness of the display panel. The pattern portion 1200 is located in the display region 1101 of the display panel 1000 for receiving or transmitting electromagnetic waves, and the bonding portion 1230 is connected with the pattern portion 1220 and located in the non-display region 1102 of the display panel 1000 for providing electrical signals to the pattern portion 1220.

For example, in some examples, the pattern portion 1220 is arranged in the display region 1101 of the display panel 1000. The pattern portion 1220 is opposite to the reflection layer 1230 so as to ensure the intensity of antenna radiation.

For example, in some examples, the bonding portion 1230 may be arranged in the non-display region 1102 of the display panel 1000. Arrangement of the bonding portion 1230 in the non-display region 1102 can ensure that the bonding portion 1230 does not affect the display function of the display panel 1000.

For example, in some embodiments, according to the design space surrounding the display panel 1000, at least part of the structure of the pattern portion 1220 close to the bonding portion 1230 may be arranged in the non-display region 1102 of the display substrate. Embodiments of the present disclosure are not limited to this.

For example, in some embodiments, as shown in FIG. 19A, the pattern portion 1220 is formed by a plurality of antenna patterns 1240 (i.e., metal grid) uniformly arrayed, and the antenna patterns 1240 include a plurality of metal wires 1241. A plurality of metal wires 1241 of the antenna pattern 1240 are formed as a diamond-shaped conductive grid. The antenna pattern 1240 is used to transmit or receive electromagnetic waves through the conductive grid. The above arrangement of the antenna pattern can reduce the loss of the input electrical signal.

For example, in other embodiments, the plurality of metal wires 1241 may also form a conductive grid in other shape, such as rectangle, polygon, etc.

Figure 19B:
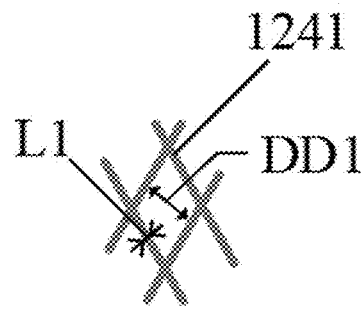
FIG. 19B illustrates an enlarged view at M in FIG. 19A.

FIG. 19B illustrates an enlarged view at M in FIG. 19A.

For example, in some embodiments, the line width of the metal wires 1241 may be less than or equal to 5 microns. For example, as shown in FIG. 19A and FIG. 19B, the line width L1 of the metal wires 1241 refers to the cross-sectional width in the direction perpendicular to the routing of the metal wires 1241. For example, the distance DD1 between the metal wires 1241 in the antenna pattern 1240 (for example, the relative vertical distance between two adjacent metal wires 1241) is greater than or equal to 200 microns. The above dimensional design can ensure the light transmittance of the display panel.

For example, in some embodiments, the material of the metal wires 1241 may include low resistance and low loss metal, such as copper, gold or silver, etc.

For example, in some embodiments, as shown in FIG. 19A, a plurality of antenna patterns 1240 include a feed portion 1201, an antenna radiation portion 1202, and a reference signal pattern portion 1203, respectively. The feed portion 1201 has a long-and-narrow shape and the antenna radiation portion 1202 has a rectangular shape. The shorter side of the feed portion 1201 is electrically connected with the antenna radiation portion 1202 to supply a signal current to the antenna radiation portion 1202. For example, the bonding portion 1230 includes a signal bonding portion 1231 and a ground bonding portion 1232. The signal bonding portion 1231 is connected with the feed portion 1201, so that the feed portion 1201 receives the electrical signal transmitted by the signal bonding portion 1231 and can supply the signal current to the antenna radiation portion 1202 by means of electrical coupling or magnetic coupling. The reference signal pattern portion 1203 is arranged at intervals with the feed portion 1201 and the antenna radiation portion 1202, and is located at both sides of the feed portion 1201 away from the antenna radiation portion 1202. The reference signal pattern portion 1203 is connected to the ground bonding portion 1232, and receives an electrical signal provided by the ground bonding portion 1232. The reference signal pattern portion 1203 can be implemented as a grounding plate of the antenna layer 1200 for providing a reference signal for the antenna radiation portion 1202, and the signal current distribution of the reference signal pattern portion 1203 can affect the directional characteristics of antenna radiation of the antenna radiation portion 1202.

For example, in some embodiments, the distance DD2 between the reference signal pattern portion 1203 and the antenna radiation portion 1202 (the vertical distance between the reference signal pattern portion 1203 and the antenna radiation portion 1202, that is, the width of the gap between the reference signal pattern portion 1203 and the antenna radiation portion 1202) may be 200 microns to 300 microns. A distance DD3 between the reference signal pattern portion 1203 and the feed portion 1201 (vertical distance between the reference signal pattern portion 1203 and the feed portion 1201, that is, the width of the gap between the reference signal pattern portion 1203 and the feed portion 1201) may be from 250 microns to 400 microns. For example, in FIG. 19A, the distance D2 between the reference signal pattern portion 1203 and the antenna radiation portion 1202 is about 250 microns, and the distance D3 between the reference signal pattern portion 1203 and the feed portion 1201 is about 330 microns. Here, the word "about" indicates that the value can vary within ±5% of its value. Within the above size range, the spacing between the reference signal pattern portion 1203, the antenna radiation portion 1202 and the feed portion 1201 can ensure the directional characteristics of antenna radiation.

For example, in other embodiments, the signal bonding portion 1231, the feed portion 1201, the antenna radiation portion 1202, the reference signal pattern portion 1203, and the ground bonding portion 1232 may be provided in different film layers of the display panel 1000, which is not limited by the embodiments of the present disclosure.

For example, in some embodiments, the shape of the antenna radiation portion 1202 may be one selected from the group consisting of trapezoid, polygon, circle and ellipse. FIG. 20A to FIG. 20E respectively illustrates embodiments of the pattern portions 1220 under the case where the antenna radiation portions 1202 are of different shapes.

Figure 20A:
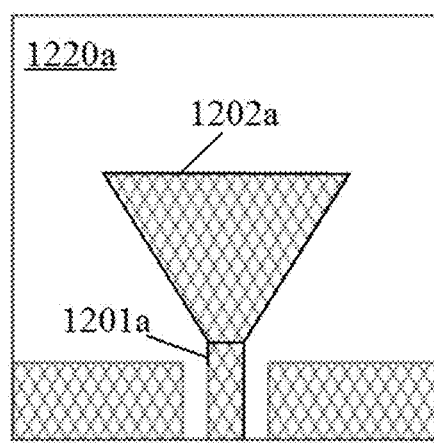
FIG. 20A illustrates a schematic diagram of a pattern portion of an antenna unit according to an embodiment of the present disclosure.

For example, as shown in FIG. 20A, the antenna radiation portion 1202*a* of a pattern portion 1220*a* is in a trapezoidal shape, and the short side of the antenna radiation portion 1202*a* is opposite to and electrically connected with the feed portion 1201*a*.

Figure 20B:
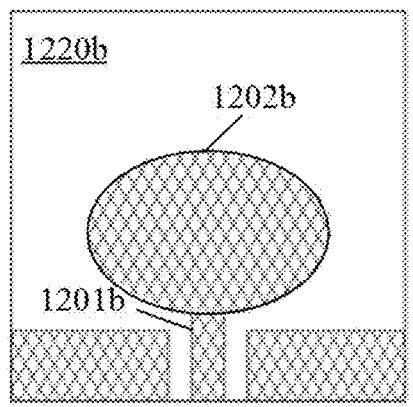
FIG. 20B illustrates a schematic diagram of a pattern portion of another antenna unit according to an embodiment of the present disclosure.

For example, as shown in FIG. 20B, the antenna radiation portion 1202*b* of a pattern portion 1220*b* is in an ellipse shape, and one side of the antenna radiation portion 1202*b* opposite to the long axis of the ellipse 1 shape is electrically connected with the feed portion 1201*b*.

Figure 20C:
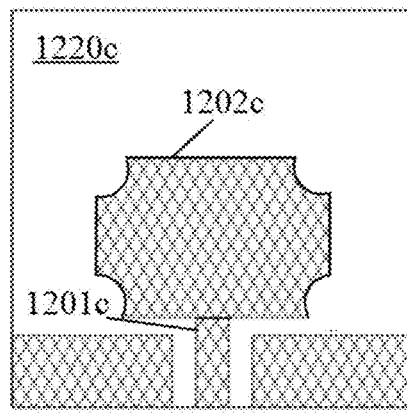
FIG. 20C illustrates a schematic diagram of a pattern portion of still another antenna unit according to an embodiment of the present disclosure.

For example, as shown in FIG. 20C, the antenna radiation portion 1202*c* of a pattern portion 1220*c* is a pattern consisting of a rectangle shape and four circular arcs, and the long side of the antenna radiation portion 1202*c* is opposite to and electrically connected with the feed portion 1201*c*. For example, the pattern of the antenna radiation portion 1202*c* may also be consisting of a rectangle shape and one circle arc, two circle arcs, three circle arcs, or circle arcs with other numbers.

Figure 20D:
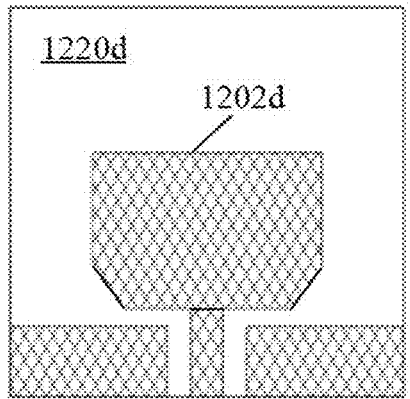
FIG. 20D illustrates a schematic diagram of a pattern portion of still another antenna unit according to an embodiment of the present disclosure.

For example, as shown in FIG. 20D, the antenna radiation portion 1202*d* of a pattern portion 1220*d* is in a hexagon shape, and the hexagon shape is formed by cutting a rectangle by two lines, and the antenna radiation portion 1202*d* is electrically connected with the feed portion 1201*d*. For example, the shape of the antenna radiating portion 1201*d* may also be heptagon, octagon, and the like.

Figure 20E:
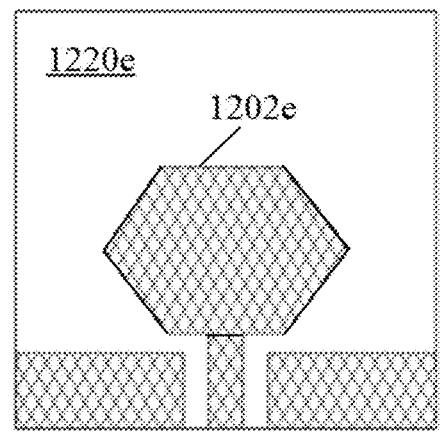
FIG. 20E illustrates a schematic diagram of a pattern portion of still another antenna unit according to an embodiment of the present disclosure.

For example, as shown in FIG. 20E, the shape of the antenna radiation portion 1202*e* of a pattern portion 1220*e* is regular hexagon, and the antenna radiation portion 1202*e* is electrically connected with the feed portion 1201*e*.

It should be noted that the shapes of the antenna radiation portions shown in the above embodiments are only some examples of the embodiments of the preset disclosure, and other modifications of the shapes of the antenna radiation portions are also included in the scope of the embodiments of the present disclosure.

Figure 20F:
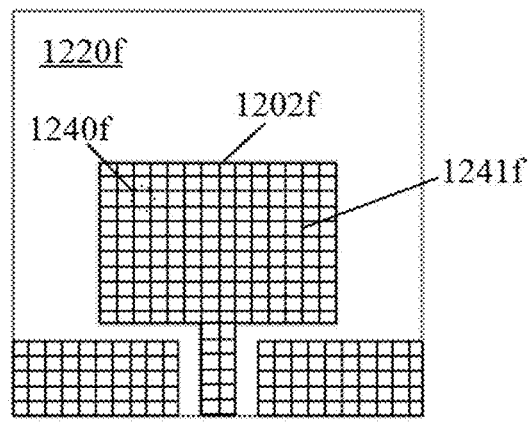
FIG. 20F illustrates a schematic diagram of a pattern portion of still another antenna unit according to an embodiment of the present disclosure.

FIG. 20F illustrates a schematic diagram of a pattern portion of another antenna unit according to an embodiment of the present disclosure.

For example, in some embodiments, as shown in FIG. 20F, a plurality of metal wires 1241*f* of an antenna pattern 1240*f* are formed as conductive grid in a rectangular shape. The antenna radiation portion 1202*f* of the pattern portion 1220*f* is in a rectangular shape, but it may also be of other shapes as shown in the above embodiments, which is not limited by the embodiments of the present disclosure.

For example, in some embodiments, as shown in FIG. 17, the display device further includes a cover plate 1500 arranged at a first side of the display panel 1000, thereby providing protection for the display panel 1000 and other components. The antenna layer 1200 is arranged at a side of the cover plate 1500 facing the display panel 1000. That is, the cover plate 1500 is arranged above the antenna layer 1200 in the Z direction, that is, the antenna layer 1200 is arranged at a side of the cover plate 1500 facing the display panel 1000. The cover plate 1500 can also protect the antenna layer 1200 as well as dustproof.

For example, the cover plate 1500 may be a transparent glass cover plate or a plastic cover plate to ensure the light transmittance of the display panel 1000. The cover plate 1500 can be made of transparent material, such as glass, silicon wafer, quartz or plastic.

For example, the thickness of the cover plate 1500 ranges from 200 microns to 600 microns For example, in some embodiments, as shown in FIG. 17 and FIG. 19A, the display device further includes feed line(s) 1400. The feed line 1400 is electrically connected to the bonding portion 1230 and configured to provide an electrical signal to the antenna unit 1210 or receive an electrical signal from the antenna unit 1210, that is, to provide a signal connection for the antenna unit 1210. For example, the feed line 1400 is electrically connected with the signal bonding portion 1231 of the bonding portion 1230 to provide an electrical signal to the signal bonding portion 1231, the signal bonding portion 1231 supplies a signal current to the feed portion 1201. The feed line 1400 is also electrically connected with the ground bonding portion 1232 of the bonding portion 1230 to provide an electrical signal to the ground bonding portion 1232, the ground bonding portion 1232 provides a signal current to the reference signal pattern portion 1203, and the distribution of the signal current of the reference signal pattern portion 1203 can affect the directional characteristics of the antenna radiation portion.

For example, in some embodiments, the feed line 1400 may be a LCP (Liquid Crystal Polymer) flexible transmission line, a MPI (Modified PI) flexible transmission line, etc., to realize signal transmission between the antenna layer 1200 and other modules of the terminal device. Embodiments of that present disclosure are not limited to this.

For example, in some embodiments, the feed line 1400 and the bonding portion 1230 of the antenna layer 1200 may be connected by means of conductive adhesive bonding, Anisotropic Conductive Film (ACF) bonding, and the like. Embodiments of the present disclosure are not limited to this.

Figure 21A:
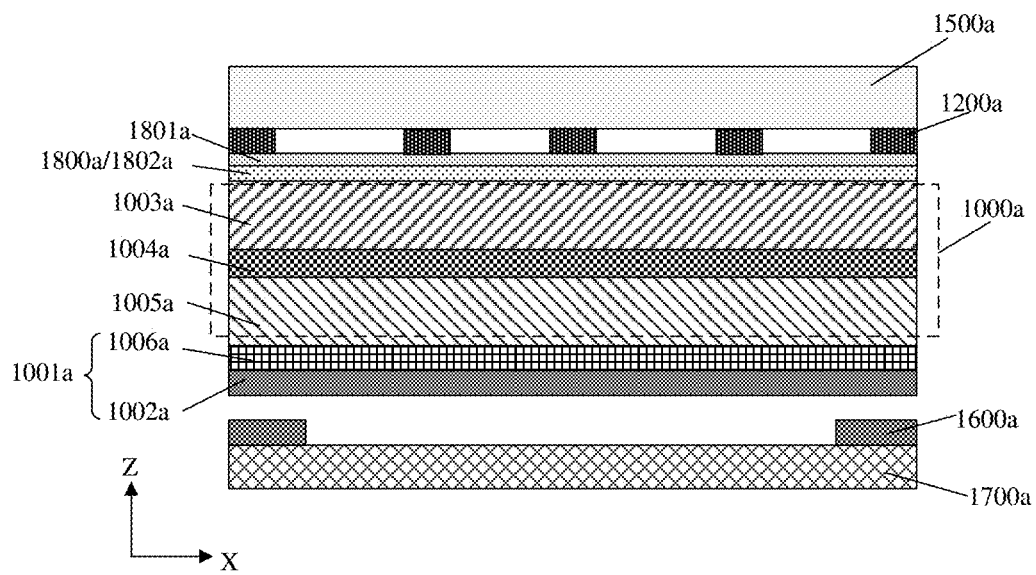
FIG. 21A illustrates a schematic cross-sectional view of a display panel according to an embodiment of the present disclosure along line A-B in FIG. 18.

FIG. 21A illustrates a schematic cross-sectional view of a display panel according to an embodiment of the present disclosure along line A-B in FIG. 18.

For example, in some embodiments, as shown in FIG. 21A, the display panel 1000 further includes a liquid crystal panel 1000*a* and a backlight module 1001*a*. The backlight module 1001*a* includes a metal reflection plate 1002*a* at one side away from the liquid crystal panel 1000*a*, and the reflection layer 1300 includes the metal reflection plate 1002*a* or a part of the metal reflection plate 1002*a*. In the above design, the metal reflection plate 1002*a* in the backlight module 1001*a* includes the reflection layer 1300, which can reduce the number of film layers in the display panel 1000, and be favorable to the thinness of the display panel 1000, and improve the functional integration of the display panel 1000.

For example, the liquid crystal panel 1000a includes an array substrate 1005a and a color film substrate 1003a, and the display substrate 1100 can also be arranged as an array substrate 1005a or a color film substrate 1003a, the array substrate 1005a and the color film substrate 1003a are examples of the display substrates of the above embodiments. The liquid crystal panel 1000a further includes a liquid crystal layer 1004a located between the array substrate 1005a and the color film substrate 1003a, the liquid crystal layer 1000a is hermetically contacted (i.e., seamlessly contacted) with the array substrate 1005a and the color film substrate 1003a by the frame sealant. The backlight module 1001a further includes a backlight layer 1006a located between the metal reflection plate 1002a and the array substrate 1005a. For example, the backlight layer 1006a may include a light guide plate to make the optical signals transmitted to the first side of the display panel through the light guide plate.

For example, in some embodiments, the display device further includes a touch control module 1800a, the touch control module 1800a includes a touch control layer 1802a between the antenna layer 1200a and the liquid crystal panel 1000a, and the touch control layer is insulated from the antenna layer. The display device further includes an insulation layer 1801a located between the touch control layer 1802a and the antenna layer 1200a. The touch control layer 1802a is insulated from the antenna layer 1200a by an insulation layer 1801a. For example, the touch control layer 1802a may be electrically connected with a touch control processor (touch chip) to realize the touch control function. For example, the touch control layer 1802a may be implemented in various types, such as resistive or capacitive touch control structures, and the capacitive touch control structure may be self-capacitance or mutual-capacitance. The self-capacitance touch control structure includes a plurality of self-capacitance electrodes arranged in an array (on the same layer), and each self-capacitance electrode is electrically connected with the touch control processor through a touch control lead. The position detection is realized by detecting the capacitance change of the self-capacitance electrode due to, for example, the proximity of a finger during touching. The mutual-capacitance touch control structure includes an excitation electrode and an induction electrode which are crossed and arranged in the same layer so as to realize the touch control function of the display substrate. In the touch control structure, for example, the induction electrode is segmented and the excitation electrode is continuous. At the position where the excitation electrode and the induction electrode cross each other, a bridge electrode is provided in a different layer from the excitation electrode and the induction electrode, to electrically connect two adjacent segments of the induction electrode with each other. The touch sensitivity of the display substrate can be improved by setting the induction electrode and the excitation electrode.

For example, the material of the touch control layer 1802a may include indium tin oxide (ITO), and thus a transparent electrode may be obtained, or may further include a metal grid to obtain a transparent electrode. The thickness of the touch control layer 1802a is greater than or equal to 10 microns. Specifically, the touch control layer includes touch control electrodes.

For example, the material of the insulation layer 1801a may include transparent insulation materials, such as polyethylene terephthalate PET insulation material, polyimide (Pi), and the like. For example, in some embodiments, as shown in FIG. 21A, the antenna layer 1200 is arranged on the touch control module 1800a and located below the cover plate 1500a in the Z direction. The antenna layer 1200 and the metal reflection plate 1002a are provided opposite to each other in the Z direction, which can enhance the radiation directivity of the antenna, make the antenna have broadband characteristics, and can cover a wide frequency band at the same time, as well as reduce the space occupied by the antenna.

Figure 21B:
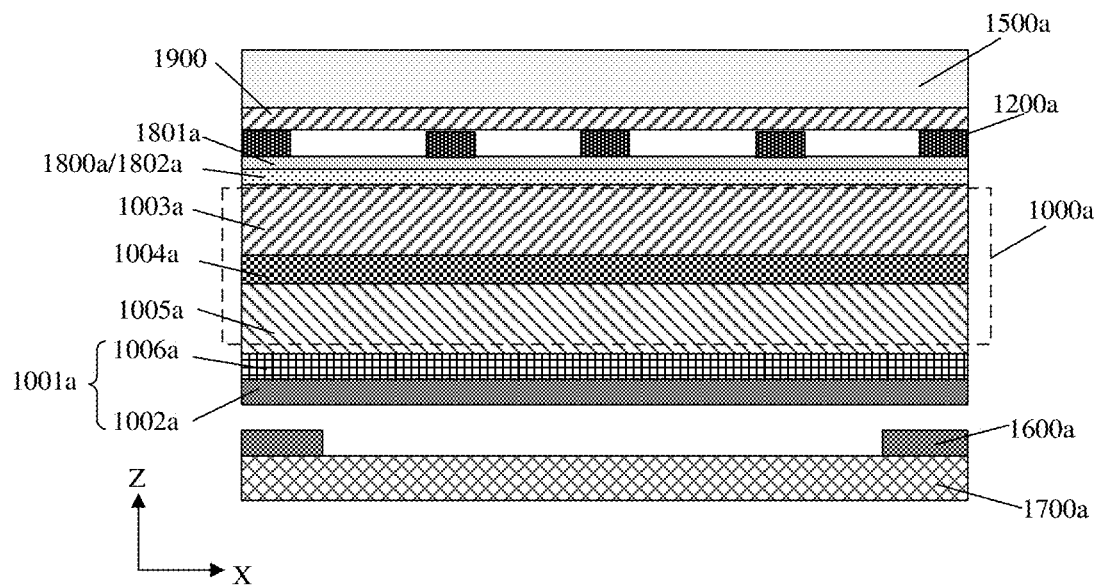
FIG. 21B illustrates a schematic cross-sectional view of a display panel according to another embodiment of the present disclosure along line A-B in FIG. 18.

For example, in other embodiments, the liquid crystal panel 1000a as shown in FIG. 21A may not include the touch control module 1800a. Under this case, the liquid crystal panel 1000a does not have a touch control function, and the embodiments of the present disclosure are not limited to this. For example, in some examples, the display device may further include a radio frequency device 1600a and a main board 1700a. The radio frequency device 1600a and the main board 1700a will be described in detail in the following embodiments. FIG. 21B illustrates a schematic cross-sectional view of a display panel according to another embodiment of the present disclosure along line A-B in FIG. 18.

For example, in some embodiments, as shown in FIG. 21B, the display device further includes a polarizing film 1900. The polarizing film 1900 is arranged on a side of the antenna layer 1200a away from the display panel (e.g., the liquid crystal panel 1000a). For example, the polarizing film 1900 is arranged in the whole surface. For example, the polarizing film has a light reflection function to reduce the light reflection of the metal grid (the antenna pattern 1240) of the antenna layer, thereby improving the optical effect.

For example, in other embodiments, the polarizing film 1900 is not arranged in the whole surface. For example, at least part of the orthogonal projection of the polarizing film 1900 on the plane of the light-emitting surface of the display panel, overlaps with the orthogonal projection of the metal grid (antenna pattern 1240) of the antenna layer 1200a on the plane of the light-emitting surface of the display panel.

Figure 22:
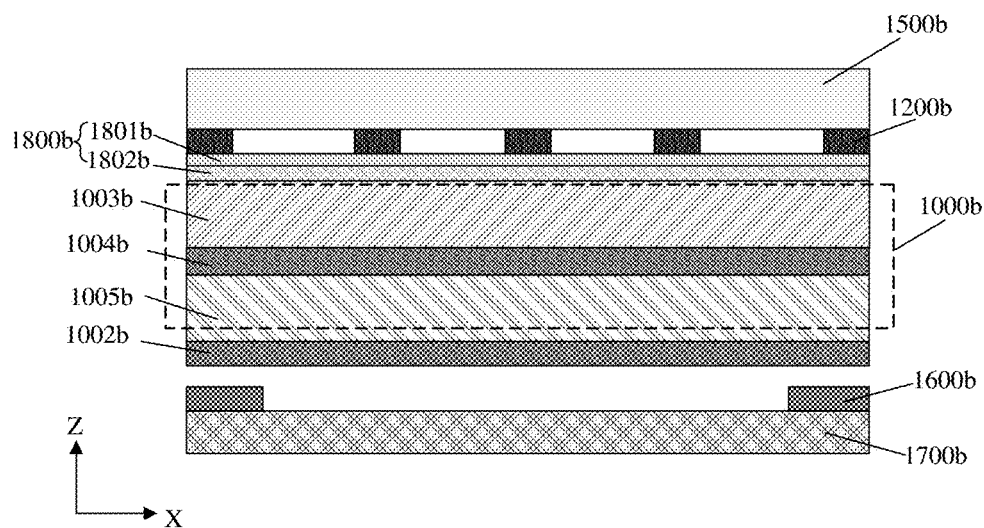
FIG. 22 illustrates a schematic cross-sectional view of another display panel according to an embodiment of the present disclosure along line A-B in FIG. 18.

For example, in some embodiments, as shown in FIG. 22, the display panel 1000 further includes an organic light-emitting diode display panel 1000b. The organic light-emitting diode display panel 1000b includes a first base substrate 1003b, a second base substrate 1005b and a light-emitting display layer 1004b between them. The reflection layer 1300 is also configured as a metal heat-sink layer 1002b of the organic light-emitting diode display panel 1000b, which can reduce the number of film layers in the display panel, and be favorable to the thinness of the display panel 1000, as well as improve the functional integration of the display panel 1000.

For example, the organic light-emitting diode display panel 1000b includes a second base substrate 1005b and a first base substrate 1003b, and the display substrate 1100 may also be the second base substrate 1005b or the first base substrate 1003b, that is, the second base substrate 1005b or the first base substrate 1003b is an example of the display substrate of the above embodiment. The organic light-emitting diode display panel 1000b further includes a light-emitting display layer 1004b located between the second base substrate 1005b and the first base substrate 1003b. In this example, the light-emitting unit of the second base substrate 1005b emits white light, while the first base substrate 1003b may be a color film substrate.

In addition, in other examples, the organic light-emitting diode display panel 1000b may not include the first base substrate 1003b, and under this case, the light-emitting unit on the second base substrate may emit colored light itself.

For example, the organic light-emitting diode display panel 1000b further includes a touch control module 1800b arranged on the first base substrate 1003b. The touch control module 1800*b* includes a touch control layer 1802*b* and a touch insulation layer 1801*b*, the touch insulation layer 1801*b* is located between the touch control layer 1802*b* and the antenna layer 1200*b*. The touch control layer 1802*b* is insulated from the antenna layer 1200*b* by the touch insulation layer 1801*b*. For example, the touch control layer 1802*b* may be electrically connected with a touch control processor (a touch control chip) to realize the touch control function. For example, the touch control layer 1802*b* can be implemented in various types, such as resistive or capacitive touch control structures, and the capacitive touch control structure may be self-capacitance or mutual-capacitance. The self-capacitance touch control structure includes a plurality of self-capacitance electrodes arranged in an array (on the same layer), and each self-capacitance electrode is electrically connected with the touch control processor through a touch control lead. The position detection is realized by detecting the capacitance change of the self-capacitance electrode due to, for example, the proximity of a finger during touching. The mutual-capacitance touch control structure includes an excitation electrode and an induction electrode which are crossed and arranged in the same layer so as to realize the touch control function of the display substrate. In the touch control structure, for example, the induction electrode is segmented and the excitation electrode is continuous. At the position where the excitation electrode and the induction electrode cross each other, a bridge electrode is provided in a different layer from the excitation electrode and the induction electrode, to electrically connect two adjacent segments of the induction electrode with each other. The touch sensitivity of the display substrate can be improved by setting the induction electrode and the excitation electrode.

For example, the material of the touch control layer 1802*b* may include indium tin oxide (ITO), and thereby obtaining a transparent electrode. Or may further include a metal grid, which can also result in a transparent electrode. The thickness of the touch control layer 1802*b* is greater than or equal to 10 microns.

For example, the material of the insulation layer 1801*b* may include transparent insulation materials, such as polyethylene terephthalate PET insulation material, polyimide (Pi), and the like.

For example, in some embodiments, as shown in FIG. 22, the antenna layer 1200 is arranged on the touch control module 1800*b* and located below the cover plate 1500*b* in the Z direction. The antenna layer 1200*b* and the metal heat-sink layer 1002*b* are provided opposite to each other in the Z direction, which can enhance the radiation directivity of the antenna, make the antenna have broadband characteristics, and can cover a wide frequency band at the same time, as well as reduce the space occupied by the antenna.

For example, in other embodiments, the organic light-emitting diode display panel as shown in FIG. 22 may not include the touch control module 1800*b*. Under this case, the organic light-emitting diode display panel does not have the touch control function, which are not limited by the embodiments of the present disclosure.

For example, in some examples, the display device may further include a radio frequency device 1600*b* and a main board 1700*b*. The radio frequency device 1600*b* and the main board 1700*b* will be described in detail in the following embodiments.

Figure 23A:
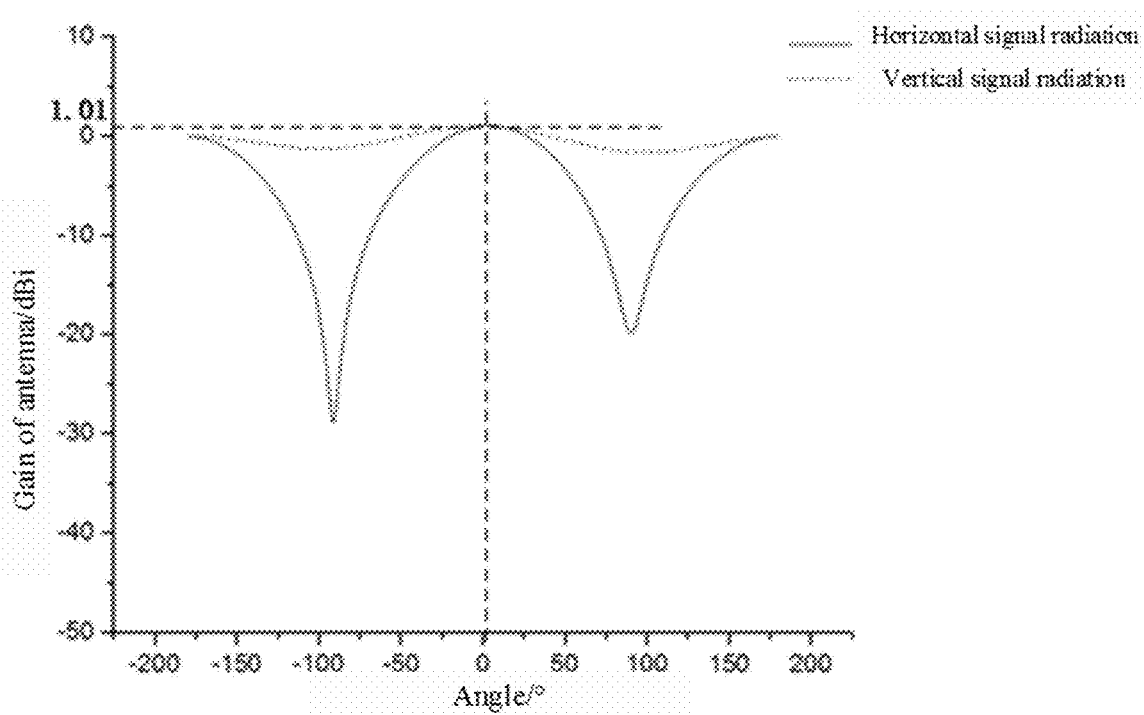
FIG. 23A illustrates an antenna radiation pattern of a display device with no reflection layer according to an embodiment of the present disclosure.
Figure 23B:
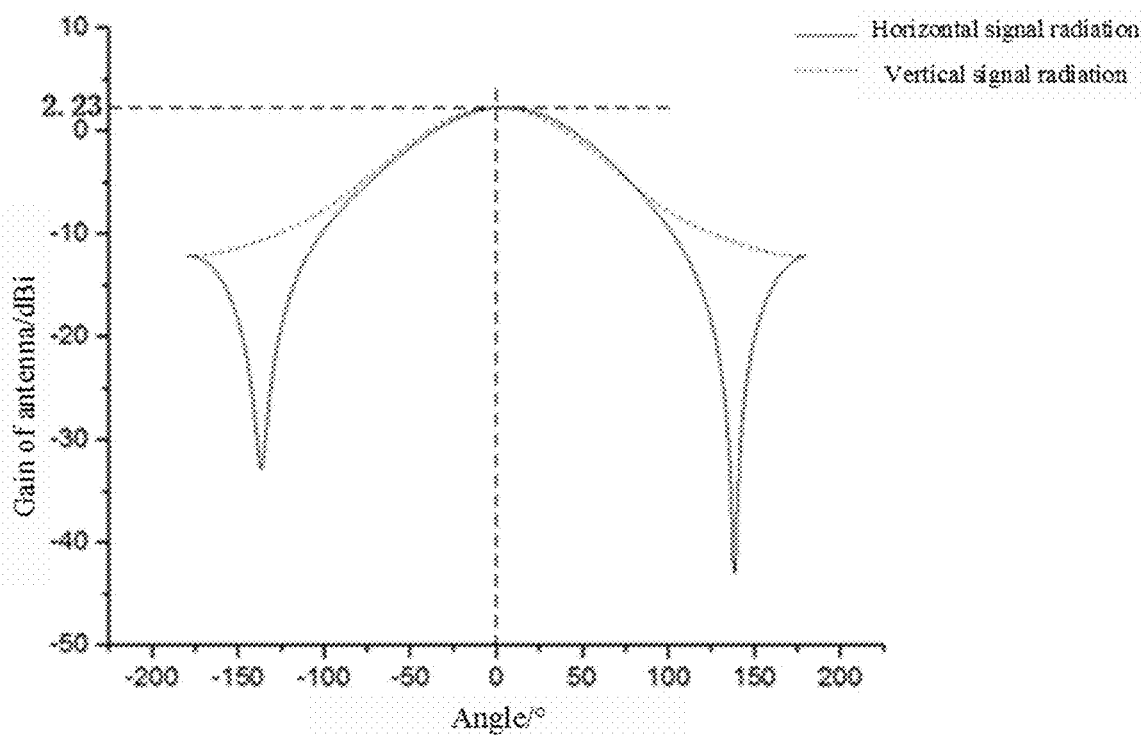
FIG. 23B illustrates an antenna radiation pattern of a display device including a reflection layer according to an embodiment of the present disclosure.
Figure 24:
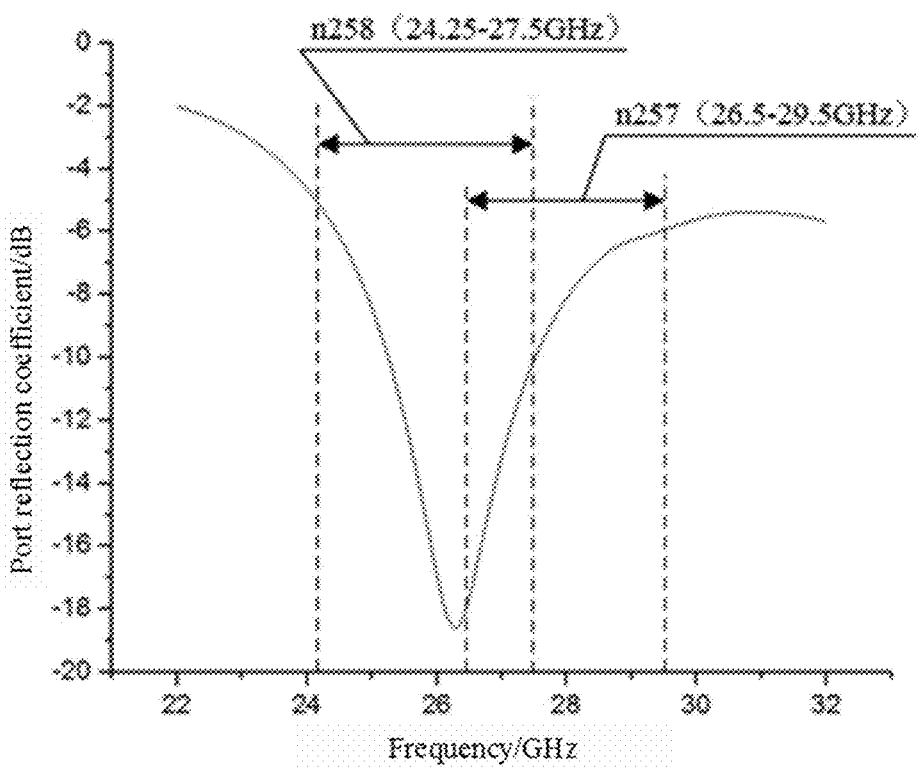
FIG. 24 illustrates a relational diagram between a port reflection coefficient and a frequency of an antenna layer in the display device according to an embodiment of the present disclosure.

For example, the antenna unit shown in FIG. 19A in the above embodiment is simulated, and FIG. 23A illustrates an antenna radiation pattern of a display device with no reflection layer according to an embodiment of the present disclosure; FIG. 23B illustrates an antenna radiation pattern of a display device with a reflection layer according to an embodiment of the present disclosure; FIG. 24 illustrates a relational diagram between a port reflection coefficient and a frequency of the antenna layer in the display device according to an embodiment of the present disclosure.

For example, as shown in FIG. 23A, under the case where the reflection layer 1300 is not provided in the display panel 1000, the antenna gains of horizontal signal radiation (e.g., obtained by planning the beam parallel to the bottom at the maximum field strength of the beam) and vertical signal radiation (e.g., obtained by planning the beam perpendicular to the bottom at the maximum field strength of the beam) are 1.01 dBi at an angle of 0 degree. As shown in FIG. 23B, under the case where the reflection layer 1300 is arranged in the display panel 1000, the antenna gains of the horizontal signal radiation and the vertical signal radiation are 2.23 dBi at an angle of 0 degree. According to the above results, by arrangement the reflection layer 1300 in the display panel 1000, the antenna gain is more than doubled compared with the case that the reflection layer 1300 is not arranged. Therefore, by arrangement the reflection layer 1300, the radiation directivity of the antenna can be enhanced.

As shown in FIG. 17 and FIG. 24, under the case where the reflection layer 1300 is arranged in the display panel 1000, from the relational diagram between the port reflection coefficient and the frequency of the antenna layer 1200, the antenna radiation of the antenna layer 1200 can cover the n257 (26.5 GHz-29.5 GHz) and n258 (24.25 GHz-27.5 GHz) millimeter wave bands specified by 3GPP standard. Therefore, by arrangement the reflection layer 1300 in the display panel 1000, the antenna can have broadband characteristics, cover a wide frequency band at the same time, and reduce the space occupied by the antenna.

For example, in some examples, the display device 100 may also be a quantum dot light-emitting diode display device, an electronic paper display device, etc., which can be used in mobile device such as mobile phone, navigation device, tablet computer, notebook computer, etc., and can also be applied to virtual reality device or enhanced display device. Of course, the display device 100 may also be other types of display devices, which is not limited by the embodiments of the present disclosure.

For example, in some embodiments, the display device further includes a radio frequency device located at the side of the reflection layer away from the display substrate, at least one antenna layer respectively includes at least one antenna unit, and at least one antenna unit respectively includes a pattern portion and a bonding portion, the pattern portion is electrically connected with the bonding portion, and the bonding portion is located in the peripheral region of the display substrate. The display panel further includes a feed line which provides a signal connection between the bonding portion and the radio frequency device to provide signal connection to the antenna unit. The antenna layer may also transmit its signal to the radio frequency device through the feed line to realize the effective connection between the RF front end and the antenna pattern.

Figure 25:
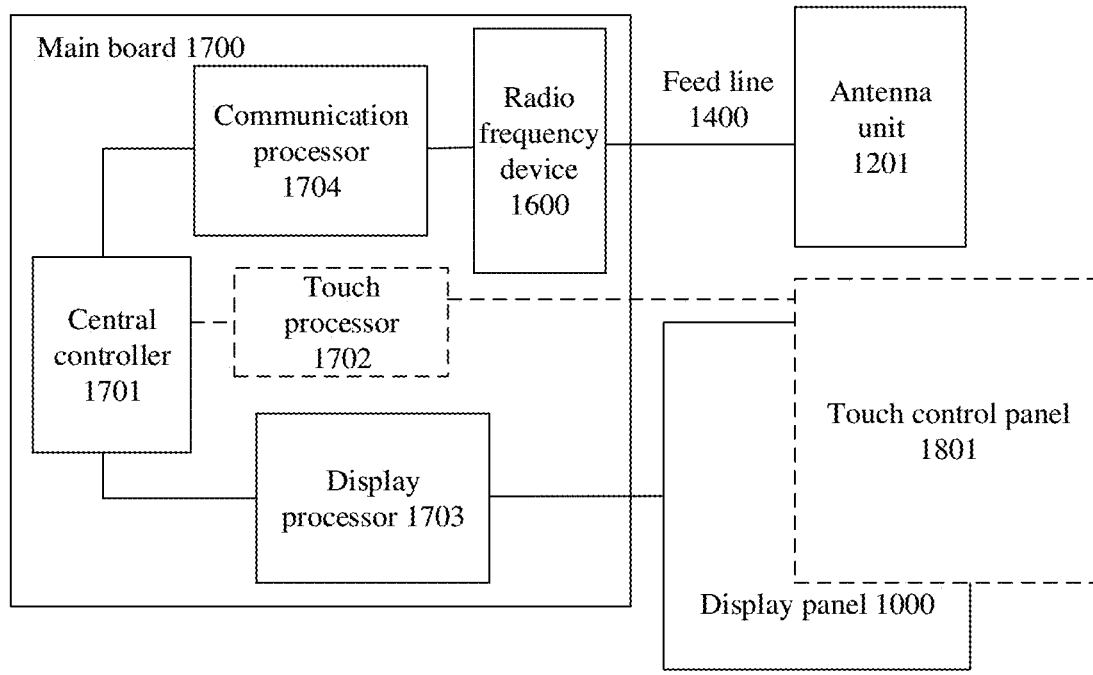
FIG. 25 illustrates a schematic block diagram of a display device according to an embodiment of the present disclosure.

FIG. 25 illustrates a schematic block diagram of a display device according to an embodiment of the present disclosure. As shown in FIG. 25, the display device includes a display panel 1000, an antenna unit 1201, and a main board 1700. As shown in FIG. 17, FIG. 21A and FIG. 22, a radio frequency device 1600 (a radio frequency device 1600*a* in FIG. 21A and a radio frequency device 1600*b* in FIG. 22) is arranged at one side of the main board 1700 (a radio frequency device 1700*a* in FIG. 21A and a radio frequency device 1700b in FIG. 22) facing the display panel 1000, that is, at a side of the reflection layer 1300 away from the display panel 1000. The antenna layer 1200 is electrically connected with the Radio frequency device 1600 through the feed line 1400, and the feed line 1400 realizes signal transmission between the antenna layer 1200 and the radio frequency device 1600. For example, the radio frequency device 1600 may include a radio frequency integrated circuit (RFIC) to communicate through communication signals (e.g., RF signals).

For example, the main board 1700 may be a printed circuit board PCB main board, and is connected with a display panel through a flexible circuit board. For example, the main board 1700 may be folded to the second side (i.e., the back side) of the display panel 1000. The main board 1700 may include a central controller 1701, a communication processor 1704, and a display processor 1703. The display processor 1703 is electrically connected with the central controller 1701 and the display panel 1000 to provide display control signals to the display panel 1000 to control the display of the display panel 1000. The communication processor 1704 is electrically connected with the radio frequency device 1600 and the central controller 1701 to realize signal control of the antenna unit 1201.

For example, the display panel 1000 may also be a touch control panel 1801 with a touch control function. In this embodiment, the main board 1700 may further include a touch control processor 1702, the touch control processor 1702 is electrically connected with the central controller 1701 and the touch control module of the touch control panel 1801 to realize the touch control function.

It should be noted that the above-mentioned functional modules included in the main board 1700 are only an example, and the main board 1700 may include some other functional modules, which is not limited by the present disclosure.

An electronic apparatus is provided by an embodiment of the present disclosure. The electronic apparatus includes a display panel, an antenna layer and a reflection layer. The antenna layer includes at least one antenna unit, the antenna layer is arranged at a display side of the display panel, and the reflection layer is arranged at a non-display side of the display panel. The distance between the antenna layer and the reflection layer in the thickness direction of the display panel is ⅛ to ⅜ of the working wavelength of the antenna unit. The distance between the antenna layer and the reflection layer can be set within the above range, which can enhance the radiation directivity and strength of the antenna, and make the antenna have broadband characteristics. The relationship between working wavelength and working frequency of antenna unit is: working wavelength=speed of light/working frequency.

For example, in other embodiments, under the case where the display panel is an OLED display panel, the distance between the antenna layer and the reflection layer in the thickness direction of the display panel may not be between ⅛ and ⅜ of the working wavelength of the antenna unit. The distance between the antenna layer and the reflection layer in the thickness direction of the display panel can be determined according to the selection of the display panel, which is not limited by the embodiments of the present disclosure.

Figure 26A:
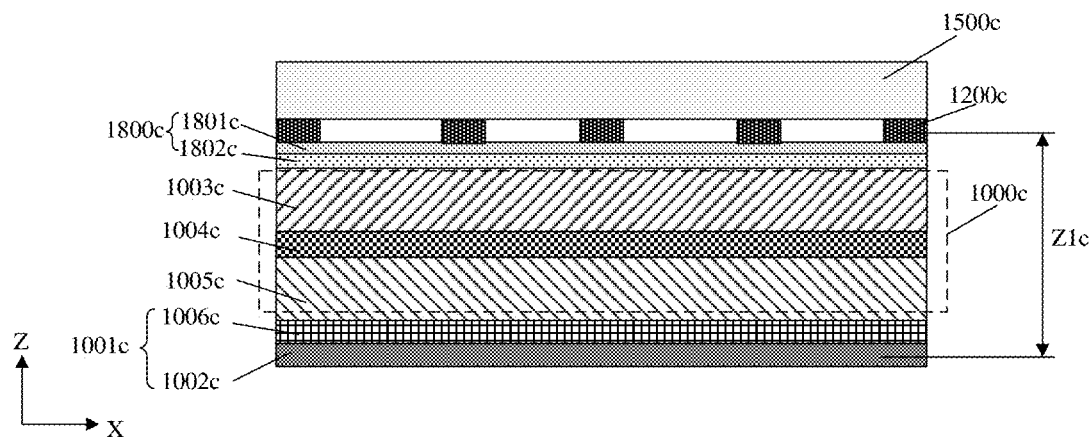
FIG. 26A illustrates a schematic cross-sectional view of a display device according to another embodiment of the present disclosure along line A-B in FIG. 18.
Figure 26B:
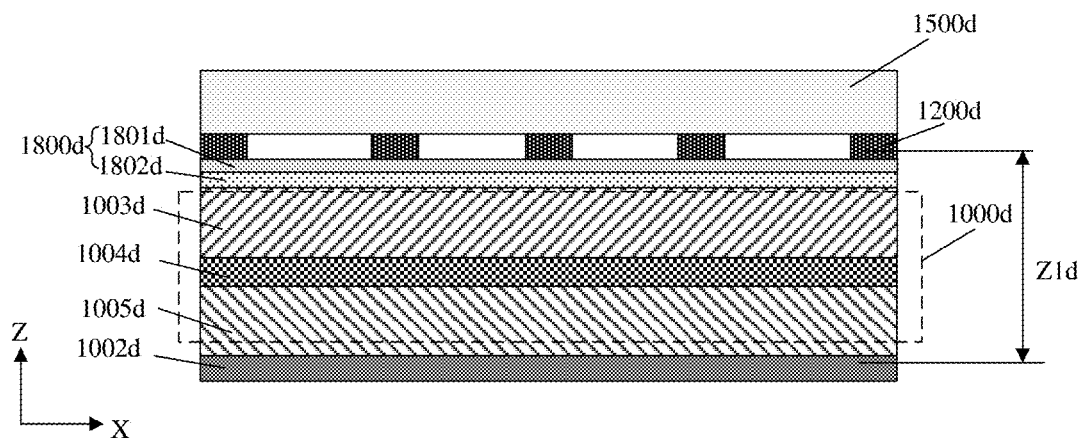
FIG. 26B illustrates a schematic cross-sectional view of a display device according to another embodiment of the present disclosure along line A-B in FIG. 18.

FIG. 26A illustrates a schematic cross-sectional view of a display device according to another embodiment of the present disclosure along line A-B in FIG. 18; FIG. 26B illustrates a schematic s cross-sectional view of a display device according to another embodiment of the present disclosure along line A-B in FIG. 18.

For example, in some examples, the display panel includes a liquid crystal panel and a backlight module, and the backlight module includes a metal reflection plate, and the reflection layer includes the metal reflection plate. As shown in FIG. 26A, the display panel includes a liquid crystal panel 1000c and a backlight module 1001c. The backlight module 1001c includes a metal reflection plate 1002c at a side away from the liquid crystal panel 1000c, and the reflection layer is the metal reflection plate 1002c or a part of the metal reflection plate 1002c. In the above design, the metal reflection plate 1002c in the backlight module 1001c is configured as the reflection layer 1300, which can reduce the number of film layers in the display panel, and be favorable to the thinness of the display panel 1000, and improve the functional integration of the display panel. The antenna layer 1200c is disposed on the touch control module 1800c in an insulated manner, and is located below the cover plate 1500c in the Z direction. The antenna layer 1200c and the metal reflection plate 1002c are provided opposite to each other in the Z direction, which can enhance the radiation directivity of the antenna, make the antenna have broadband characteristics, and can cover a wide frequency band at the same time, as well as reduce the space occupied by the antenna.

For example, in some examples, the working wavelength of the antenna emitted by the antenna layer corresponds to the frequency range of 26.5 GHz-29.5 GHz or 24.25 GHz-27.5 GHz. The frequency in the range of 26.5 GHz-29.5 GHz is the working frequency band n257 specified by the 3GPP standard (referring to the 3rd generation mobile communication standard based on GSMMAP core network and with WCDMA as wireless interface), the frequency in the range of 24.25 GHz-27.5 GHz is the working frequency band n258 specified by the 3GPP standard. The above two frequency ranges are both within the frequency range of 5G network.

For example, as shown in FIG. 26A, the distance Z1c between the antenna layer 1200c and the reflection layer (metal reflection plate 1002c) in the thickness direction of the liquid crystal panel 1000c (the distance between the thickness center of the antenna and the thickness center of the reflection layer) is in a range of 0.5 mm to 1.5 mm, for example, 0.7 mm to 1.3 mm, to ensure the intensity of antenna radiation. If the distance between the antenna layer and the reflection layer is too large or too small, the intensity of antenna radiation can be weakened or the directional characteristics of antenna radiation can be reduced.

For example, in some examples, the display panel includes an organic light-emitting diode display panel, and the reflection layer is a metal heat-sink layer of the organic light-emitting diode display panel. As shown in FIG. 26B, the display panel further includes an organic light-emitting diode display panel 1000d. The organic light-emitting diode display panel 1000d includes a first base substrate 1003d, a second base substrate 1005d and a light-emitting display layer 1004d between them. The reflection layer is also configured as a metal heat-sink layer 1002d of the organic light-emitting diode display panel 1000d, which can reduce the number of film layers in the display panel, and be favorable to the thinness of the display panel, and improve the functional integration of the display panel. The antenna layer 1200d is arranged on the touch control module 1800d in an insulated manner, and is located below the cover plate 1500d in the Z direction. The antenna layer 1200d and the metal heat-sink plate 1002d are provided opposite to each other in the Z direction, which can enhance the radiation directivity of the antenna, make the antenna have broadband characteristics, and can cover a wide frequency band at the same time, as well as reduce the space occupied by the antenna.

For example, in some examples, the working wavelength of the antenna emitted by the antenna layer corresponds to the frequency range of 26.5 GHz-29.5 GHz or 24.25 GHz-27.5 GHz. The frequency in the range of 26.5 GHz-29.5 GHz is the working frequency band n257 specified by the 3GPP standard (referring to the 3rd generation mobile communication standard based on GSMMAP core network and with WCDMA as wireless interface), the frequency in the range of 24.25 GHz-27.5 GHz is the working frequency band n258 specified by the 3GPP standard. The above two frequency ranges are both within the frequency range of 5G network.

For example, as shown in FIG. 22, the distance $Z1d$ between the antenna layer $1200d$ and the reflection layer (a metal heat-sink layer $1002d$) in the thickness direction of the organic light-emitting diode display panel $1000d$ (the distance between the center line of the antenna and the center line of the reflection layer) is in a range of 0.5 mm to 1.5 mm, for example, 0.7 mm to 1.3 mm, to ensure the intensity of antenna radiation. If the distance between the antenna layer and the reflection layer is too large or too small, the intensity of antenna radiation can be weakened or the directional characteristics of antenna radiation can be reduced.

By using the metal reflection plate in the backlight module of the liquid crystal panel as the reflection layer or the metal heat-sink layer of the organic light-emitting diode display panel as the reflection layer, the electronic apparatus provided by the above embodiments of the present disclosure can enhance the radiation directionality of the antenna, so that the antenna has broadband characteristics and can reduce the space occupied by the antenna at the same time, thereby improving the functional integration of the display panel without affecting the thickness of the display panel.

For example, in the above embodiments, the electronic apparatus can be electronic paper, mobile phone, tablet computer, television, monitor, notebook computer, digital photo frame, navigator, etc.

An embodiment of the disclosure also provides an electronic apparatus. The electronic apparatus includes a display panel, an antenna layer, and a reflection layer. The antenna layer includes at least one antenna unit, the antenna layer is arranged at the display side of the display panel, while the reflection layer is arranged at the non-display side of the display panel. The orthographic projection of the antenna unit on the plane of the light-emitting surface of the display panel is located within the orthographic projection of the reflection layer on the plane of the light-emitting surface of the display panel. By making the orthographic projection of the antenna unit on the plane of the light-emitting surface of the display panel located within the orthographic projection of the reflection layer on the plane of the light-emitting surface of the display panel, the radiation directionality and the strength of the antenna can be enhanced, and the antenna can have broadband characteristics.

Figure 27:
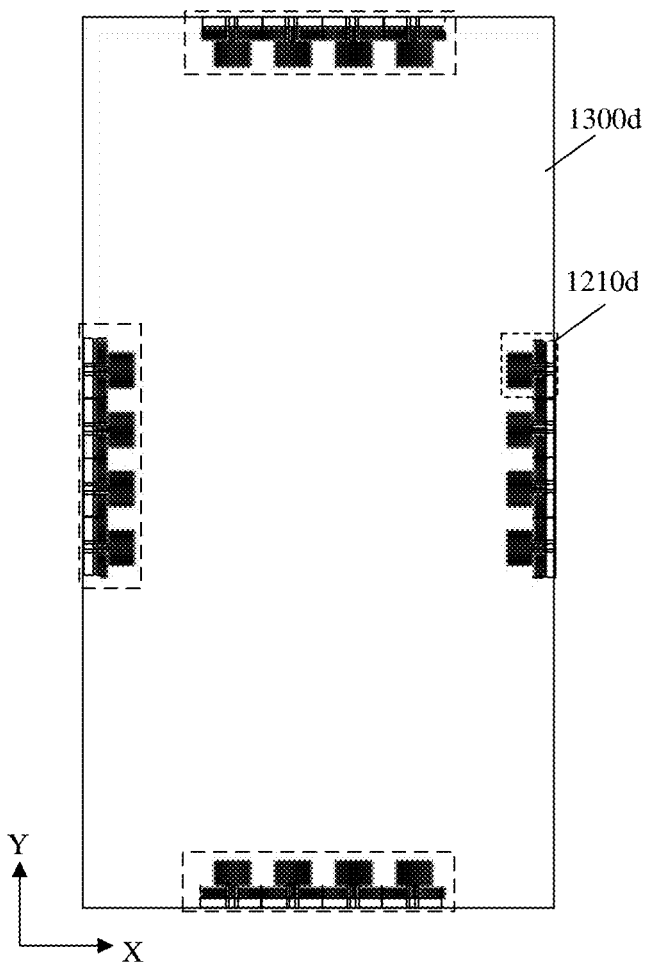
FIG. 27 illustrates a schematic top view of a display device according to another embodiment of the present disclosure.

FIG. 27 illustrates a schematic top view of a display device according to another embodiment of the present disclosure.

For example, as shown in FIG. 27, The orthographic projection of the antenna unit $1210d$ on the plane of the light-emitting surface of the display panel is located within the orthographic projection of the reflection layer $1300d$ on the plane of the light-emitting surface of the display panel $1000d$, which can enhance the radiation directivity and strength of the antenna and make the antenna have broadband characteristics. Under the case where the electronic apparatus contains a plurality of antenna units, the orthographic projection of all antenna units on the plane of the light-emitting surface of the display panel are all located within the orthographic projection of the reflection layer $1300d$ on the plane of the light-emitting surface of the display panel $1000d$, so that the antenna can have better radiation efficiency.

For example, in some examples, the display panel includes a liquid crystal panel and a backlight module, and the backlight module includes a metal reflection plate, and the reflection layer is the metal reflection plate. As shown in FIG. 26A, the display panel includes a liquid crystal panel $1000c$ and a backlight module $1001c$. The backlight module $1001c$ includes a metal reflection plate $1002c$ at a side away from the liquid crystal panel $1000c$, and the reflection layer is the metal reflection plate $1002c$ or a part of the metal reflection plate $1002c$. In the above design, the metal reflection plate $1002c$ in the backlight module $1001c$ is configured as the reflection layer $1300$, which can reduce the number of film layers in the display panel, and be favorable to the thinness of the display panel $1000$, and improve the functional integration of the display panel. The antenna layer $1200c$ is arranged on the touch control module $1800c$ (including a touch control layer $1801c$ and an insulation layer $1802c$) in an insulated manner, and is located below the cover plate $1500c$ in the Z direction. The antenna layer $1200c$ and the metal reflection plate $1002c$ are provided opposite to each other in the Z direction, which can enhance the radiation directivity of the antenna, make the antenna have broadband characteristics, and can cover a wide frequency band at the same time, as well as reduce the space occupied by the antenna.

For example, in some examples, the display panel includes an organic light-emitting diode display panel, and the reflection layer is a metal heat-sink layer of the organic light-emitting diode display panel. As shown in FIG. 26B, the display panel further includes an organic light-emitting diode display panel $1000d$. The organic light-emitting diode display panel $1000d$ includes a first base substrate $1003d$, a second base substrate $1005d$, and a light-emitting display layer $1004d$ between them. The reflection layer is also configured as a metal heat-sink layer $1002d$ of the organic light-emitting diode display panel $1000d$, which can reduce the number of film layers in the display panel, and be favorable to the thinness of the display panel, and improve the functional integration of the display panel. The antenna layer $1200d$ is arranged on the touch control module $1800d$ in an insulated manner, and is located below the cover plate $1500d$ in the Z direction. The antenna layer $1200d$ and the metal heat-sink plate $1002d$ are provided opposite to each other in the Z direction, which can enhance the radiation directivity of the antenna, make the antenna have broadband characteristics, and can cover a wide frequency band at the same time, as well as reduce the space occupied by the antenna.

By using the metal reflection plate in the backlight module of the liquid crystal panel as the reflection layer or the metal heat-sink layer of the organic light-emitting diode display panel as the reflection layer, the electronic apparatus provided by the above embodiments of the present disclosure can enhance the radiation directionality of the antenna, so that the antenna has broadband characteristics and can reduce the space occupied by the antenna at the same time, thereby improving the functional integration of the display panel without affecting the thickness of the display panel.

For example, in some examples, at least one antenna unit includes a pattern portion and a bonding portion, and the display panel includes a display region and a non-display region. The pattern portion is arranged in the display region of the display panel, and the binding portion is arranged in the non-display region of the display panel.

As shown in FIG. 18 and FIG. 19A, the antenna units 1210 includes a pattern portion 1220 and a bonding portion 1230, respectively. The pattern portion 1220 is electrically connected with the bonding portion 1230, and the bonding portion 1230 is located in the non-display region 1102 of the display substrate 1100. The pattern portion 1220 and the bonding portion 1230 are located in the same film layer, and are provided on the first side of the display substrate 1100 so as to reduce the occupied space and further contribute to reducing the thickness of the display panel. The pattern portion 1200 is located in the display region 1101 of the display substrate 1100 for receiving or transmitting electromagnetic waves, and the bonding portion 1230 is connected with the pattern portion 1220 and located in the non-display region 1102 of the display substrate 1100 to provide electrical signals to the pattern portion 1220.

For example, in some examples, the pattern portion 1220 may be arranged in the display region 1101 of the display substrate 1100 of the display panel 1000. The pattern portion 1220 is opposite to the reflection layer 1230 so as to ensure the intensity of antenna radiation.

For example, in some examples, the bonding portion 1230 may be arranged in the non-display region 1102 of the display substrate 1100 of the display panel 1000. The bonding portion 1230 is arranged in the non-display region 1102 so as to ensure that the bonding portion 1230 does not affect the display function of the display panel 1000.

Figure 29A:
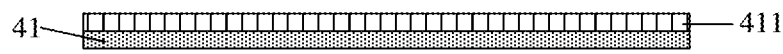
FIG. 29A-FIG. 29E illustrate a diagram of manufacturing process of an antenna unit according to at least one embodiment of the present disclosure.
Figure 29B:
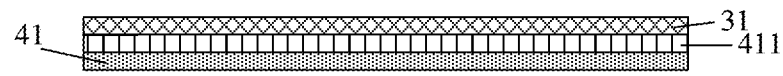

For example, in some examples, at least one antenna unit includes a pattern portion, the pattern portion includes a metal grid formed by a plurality of metal wires, where the line width of the plurality of metal wires is less than or equal to 5 microns, and the distance between the plurality of metal wires is greater than or equal to 200 microns. As shown in FIG. 29A and FIG. 29B, the line width L1 of the metal wire 1241 refers to the cross-sectional width in the direction perpendicular to the routing of the metal wire 1241. A distance D1 between the metal wires 1241 in the antenna pattern 1240 (for example, a relative vertical distance between two adjacent metal wires 1241) may be greater than or equal to 200 microns. The above dimensional design can ensure the light transmittance on the display panel.

As shown in FIG. 19A, the pattern portion 1220 is formed by a plurality of antenna patterns 1240 (i.e., metal grids) uniformly arrayed, and the antenna patterns 1240 include a plurality of metal wires 1241. A plurality of metal wires 1241 of the antenna pattern 1240 are formed as a diamond-shaped conductive grid. The antenna pattern 1240 is configured to transmit or receive electromagnetic waves through the conductive grid. The above arrangement of the antenna pattern can reduce the loss of the input electrical signal.

For example, in other embodiments, the metal wires 1241 may also form conductive grid of other shapes, such as rectangle, polygon, etc.

For example, in some embodiments, the material of the metal wire 1241 may include low resistance and low loss metal, such as copper, gold or silver.

For example, in some embodiments, as shown in FIG. 3A, at least one feed line of the antenna unit includes a first feed line and a second feed line, and the antenna unit is a dual-polarized antenna. The first feed line 320 is located at a first side of the radiation main body 310 and electrically connected with the radiation main body 310. The second feed line 330 is located at a second side of the radiation main body 310 and electrically connected with the radiation main body 310. In the example of FIG. 3A, the grounding portions include a first grounding portion 3401, a second grounding portion 3402, a third grounding portion 3403, and a fourth grounding portion 3404, which are hereinafter collectively referred to as grounding portions 340. The first grounding portion 3401 and the second grounding portion 3402 are respectively located at both sides of the first feed line 320, and the third grounding portion 3403 and the fourth grounding portion 3404 are respectively located at both sides of the second feed line 339. For example, as shown in FIG. 3A, the radiation main body 310, the first feed line 320, the second feed line 330 and the plurality of grounding portions 340 are located in the same layer in the display device. For example, a first coplanar waveguide is formed by the first grounding portion 3401, the second grounding portion 3402 and the part of the first feed line 320 located between the first grounding portion 3401 and the second grounding portion 3402, a second coplanar waveguide is formed by the third grounding portion 3403, the fourth grounding portion 3404 and the part of the second feed line 330 located between third grounding portion 3403 and the fourth grounding portion 3404. The structure of the coplanar waveguide makes the resonant parameters of the dual-polarized antenna adjustable and the bandwidth increased, thus improving the radiation performance of the antenna.

For example, in the above embodiments, the electronic apparatus can be electronic paper, mobile phone, tablet computer, television, monitor, notebook computer, digital photo frame, navigator, and the like.

A manufacturing method of a display device is provided by at least one embodiment of the present disclosure. The manufacturing method includes: providing a display panel, where the display panel includes a display region and a non-display region that at least partially surrounds the display region; forming at least one antenna unit on a first side of the display panel for display and along at least one edge of the display panel respectively; and forming a reflection layer on a second side of the display panel opposite to the first side, making the reflection layer arranged oppositely to the at least one antenna unit in a thickness direction of the display panel, where at least part of the at least one antenna unit is arranged in the non-display region of the display panel.

In the display device obtained by the above manufacturing method, the radiation directivity of the antenna can be enhanced by forming the antenna unit and the reflection layer opposite to the antenna unit, so that the antenna has broadband characteristics, and the space occupied by the antenna can be reduced, thereby reducing the thickness of the display panel and improving the functional integration of the display panel.

Figure 28:
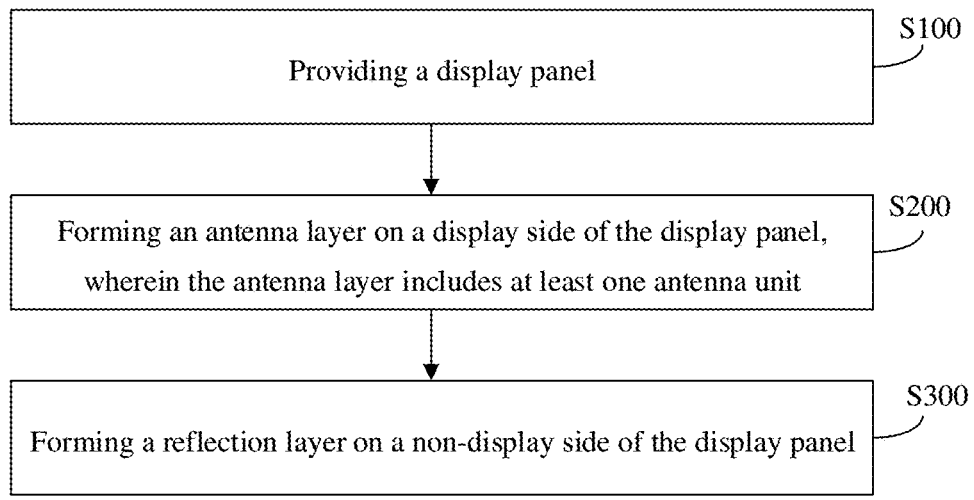
FIG. 28 illustrates a schematic flowchart of a manufacturing method of a display device according to an embodiment of the present disclosure.

FIG. 28 illustrates a schematic flowchart of a manufacturing method of a display device according to an embodiment of the present disclosure. As shown in FIG. 28, the manufacturing method may include the following steps.

Step S100, providing a display panel.

For example, the display panel may be a liquid crystal display panel or an organic light-emitting diode display panel.

Step S200, forming an antenna layer on a display side of the display panel, wherein the antenna layer includes at least one antenna unit.

For example, in some examples, a touch control module is formed on a display panel. Firstly, a touch control material layer is deposited on the display panel by the means of thermal evaporation, electroplating or other methods, then the touch control material layer is etched to form touch control electrode(s) of the touch control layer, and then a touch control insulation layer is formed on the touch control layer by the means of substrate and spin coating.

For example, forming an antenna layer on a touch control module includes: depositing a first metal material on the first side of the display substrate by using a magnetron sputtering manufacturing process to form a first metal layer, and etching the first metal layer to form an antenna layer. The antenna layer is formed to include at least one antenna unit, and the antenna unit includes a pattern portion and a bonding portion. The pattern portion is formed by an antenna patterns arranged in a uniform array, and the antenna patterns are composed of metal wires made of the first metal material.

For example, in other examples, under the case where the display panel has no touch control function, the antenna layer may be directly formed on the display side of the display panel without forming a touch control module.

For example, at least part of the antenna layer 1200 is arranged in the non-display region 1102 of the display substrate 1100.

For example, the first metal material may include low resistance and low loss metal, such as copper, gold or silver.

For example, in other embodiments, the first metal material may be deposited on the first side by the means of thermal evaporation, electroplating and other methods to form a first metal layer, and then the first metal layer is etched to form the antenna layer.

For example, in some examples, the manufacturing of the antenna unit includes: forming the antenna unit on the first side of the display panel for display. Forming the antenna unit on the first side of the display panel for display, includes: forming a flexible substrate on the first side of the display panel, forming a metal layer on the flexible substrate, etching the metal layer to form an antenna, and forming an adhesive protection layer on a side of the metal layer away from the display panel.

For example, in some examples, the manufacturing of the antenna unit further includes: forming the antenna unit on the first side of the display panel for display, and further includes: forming a passivation protection layer between the metal layer and the adhesive protection layer.

For example, in some examples, the preparation of the antenna unit further includes: forming the antenna unit on the first side of the display panel for display, and further includes: forming an antenna insulation layer on a side of the metal layer close to the display panel.

FIG. 29A-FIG. 29E illustrate a diagram of manufacturing process of an antenna unit according to at least one embodiment of the present disclosure. For example, FIG. 29A-FIG. 29E illustrate the formation of the antenna unit as shown in FIG. 2A as an example.

As shown in FIG. 29A, a flexible substrate 41 is formed on a first side of the display panel. The flexible substrate 41 is, for example, the flexible substrate 40 in FIG. 2A. An antenna insulation layer 411 is formed on the flexible substrate 41. For example, the antenna insulation layer 411 is formed by depositing (e.g., chemical vapor deposition) insulation materials such as the silicon dioxide materials on the flexible substrate 41. For example, the antenna insulation layer 411 may be a buffer layer. For example, the range of the thickness of the antenna insulation layer 411 is, for example, about 80 Å-120 Å, and for example, about 90 Å-100 Å. For example, the thickness of the antenna insulation layer 411 is, for example, about 100 Å.

As shown in FIG. 29B, a metal layer 31 is formed on the antenna insulation layer 411. For example, a metal layer 31 is formed by depositing metal materials on the antenna insulation layer 411 by the means of magnetron sputtering manufacturing process, thermal evaporation process, electroplating process, pressing process, and the like. For example, the metal layer may be a single layer of metal or a stack of multiple layers of metal. For example, a single layer of metal may include copper and the like. The stack of multiple layers may include a stack structure of MoNb/Cu/CuNi/MoNbNx. The range of the thickness of the MoNb metal layer is, for example, about 250 Å-350 Å. The range of thickness of the Cu metal layer is, for example, about 6000 Å-8000 Å. The range of thickness of the CuNi metal layer is, for example, about 400 Å-600 Å. The range of the thickness of the MoNbNx metal layer is, for example, about 500 Å-600 Å. The value of the thickness of each layer of the multiple layers of metal (MoNb/Cu/CuNi/MoNbNx) may be 300 Å、7000 Å、500 Å、550 Å. For example, the antenna insulation layer 411 may increase the bonding force between the metal layer 31 and the flexible substrate 41.

Figure 29C:
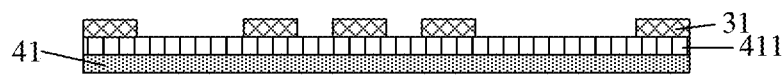

As shown in FIG. 29C, the metal layer is etched to form an antenna 32 (for example, the dual-polarized antenna 30 as shown in FIG. 2A).

Figure 29D:
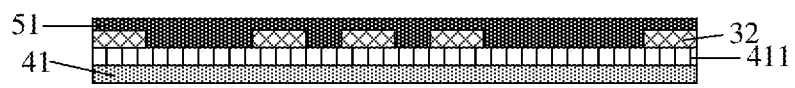

As shown in FIG. 29D, a passivation protection layer 51 is formed by depositing (e.g., chemical vapor deposition) insulation material on the antenna 32. For example, the material of the passivation protection layer 51 includes insulation material such as silicon dioxide or silicon nitride. For example, the thickness of the passivation protection layer 51 ranges from about 1500 Å to 2100 Å. For example, the thickness of the passivation protection layer 51 is about 1800 Å. For example, the passivation protection layer 51 can protect the antenna 32 from oxidation or corrosion.

Figure 29E:
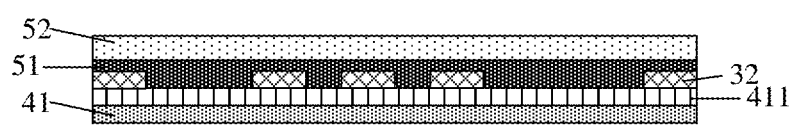

As shown in FIG. 29E, the adhesive protection layer 51 is formed by depositing (e.g., chemical vapor deposition) insulation materials on the passivation protection layer 51. The adhesive protection layer 51 is, for example, the first adhesive layer 50 in FIG. 2A. The adhesive protection layer 51 is configured to bond the antenna unit with other films, such as the protection layer 10. For example, the thickness of the adhesive protection layer 51 ranges from about 1.5 μm to 2.5 μm. For example, the thickness of the adhesive protection layer 51 is about 2 μm.

It should be noted that, in the embodiment of the present disclosure, "about" means that the taken value can vary within its range, for example, 5% or 15%.

Step S300, forming a reflection layer on the non-display side of the display panel.

For example, the reflection layer can be realized as a metal reflection plate on the side away from the liquid crystal panel in the backlight module of the liquid crystal panel, or can be realized as a metal heat-sink layer of an organic light-emitting diode display panel.

For example, in some embodiments, the manufacturing method further includes forming a feed line and electrically connecting the feed line with the antenna layer. The antenna layer and a radio frequency device are connected by the feed line to provide electrical signal for the antenna layer. The antenna layer can also transmit its signal to the radio frequency device through the feed line to realize the effective connection between the radio frequency front end and the antenna pattern.

For example, in some embodiments, the manufacturing method further includes forming a cover plate on the display side of the display panel, and providing at least one antenna layer on the surface of the cover plate facing the first side of the display substrate. For example, the cover plate may be a transparent glass cover plate made of glass material to ensure the light transmittance of the display panel. It should be noted that, when the antenna layer has been formed, the manufacturing method can directly form a cover plate on the side of the antenna layer away from the display panel. The cover plate can protect the antenna layer.

It should be noted that, in various embodiments of the present disclosure, the flow of the manufacturing method of the display device may include more or less operations, which may be executed sequentially or in parallel. Although the flow of the manufacturing method described above includes a plurality of operations occurring in a specific order, it should be clearly understood that the order of the plurality of operations is not limited. The above-described manufacturing method can be performed once or multiple times according to predetermined conditions.

The following statements should be noted:

(1) The accompanying drawings involve only the structure(s) in connection with the embodiment(s) of the present disclosure, and other structure(s) can be referred to common design(s).

(2) In case of no conflict, the embodiments of the present disclosure and the features in the embodiments can be combined with each other to obtain new embodiments.

The above are merely specific implementations of the present disclosure without limiting the protection scope of the present disclosure thereto. The protection scope of the present disclosure should be based on the protection scope of the appended claims.

What is claimed is:

1. An antenna unit, comprising:
a radiation main body,
at least one feed line, electrically connected with the radiation main body, and
a plurality of grounding portions,
wherein the radiation main body, the at least one feed line, and the plurality of grounding portions are provided in a same layer;
the at least one feed line comprises a first feed line and a second feed line, and the antenna unit comprises a dual-polarized antenna; the first feed line is located at a first side of the radiation main body and electrically connected with the radiation main body, and the second feed line is located at a second side of the radiation main body and electrically connected with the radiation main body;
the plurality of grounding portions comprise a first grounding portion, a second grounding portion, a third grounding portion, and a fourth grounding portion, wherein the first grounding portion and the second grounding portion are respectively located at both sides of the first feed line, and the third grounding portion and the fourth grounding portion are respectively located at both sides of the second feed line;
the first feed line comprises a first section and a second section, the first section is close to the radiation main body, the second section is electrically connected with the first section, the first section is electrically connected with the radiation main body, and the second section extends from the first section between the first grounding portion and the second grounding portion;
the second feed line comprises a third section and a fourth section, the third section is close to the radiation main body, and the fourth section is electrically connected with the third section, the third section is electrically connected with the radiation main body, and the fourth section extends from the third section between the third grounding portion and the fourth grounding portion,
the radiation main body has a symmetrical contour, the first section and the third section are symmetrical with respect to a symmetry axis of the radiation main body, and the second section and the fourth section are unsymmetrical with respect to the symmetry axis of the radiation main body.

2. The antenna unit according to claim 1, wherein the symmetry axis of the radiation main body is a diagonal line led out from an included angle formed by the first side and the second side of the radiation main body.

3. The antenna unit according to claim 2, wherein the first grounding portion, the second grounding portion, the third grounding portion, and the fourth grounding portion are arranged along a reference direction,
the symmetry axis of the radiation main body is perpendicular to the reference direction,
at least one selected from the group consisting of the first section and the third section is perpendicular to the symmetry axis of the radiation main body, and
at least one selected from the group consisting of the second section and the fourth section is perpendicular to the reference direction.

4. The antenna unit according to claim 3, wherein a position where the third section is electrically connected with the radiation main body and a position where the first section is electrically connected with the radiation main body are symmetrical with respect to the symmetry axis of the radiation main body.

5. The antenna unit according to claim 1, wherein a distance between the first feed line and the first grounding portion and a distance between the first feed line and the second grounding portion are equal to an integral multiple of a line width of the first feed line, and a distance between the second feed line and the third grounding portion and a distance between the second feed line and the fourth grounding portion are equal to an integral multiple of a line width of the second feed line.

6. The antenna unit according to claim 1, wherein the radiation main body, the first feed line, the second feed line, and the plurality of grounding portions all comprise metal grids.

7. The antenna unit according to claim 1, wherein at least part of the radiation main body is electrically connected with the at least one feed line.

8. The antenna unit according to claim 7, wherein a part of the radiation main body is electrically connected with the at least one feed line, and a part of the radiation main body that is not electrically connected with the at least one feed line is coupled in signal with the part of the radiation main body that is electrically connected with the at least one feed line.

9. The antenna unit according to claim 1, wherein the radiation main body comprises an antenna radiation portion, the at least one feed line comprises a feed portion, each of the plurality of grounding portions comprises a reference signal pattern portion,
the feed portion is electrically connected with the antenna radiation portion to provide a signal current to the antenna radiation portion, and reference signal pattern portions are arranged at intervals with the feed portion and the antenna radiation portion, and are located at both sides of the feed portion away from the antenna radiation portion.

10. A display device, comprising:
a display panel,
an antenna layer, comprising at least one antenna unit according to claim 1, the at least one antenna unit being provided at a display side of the display panel, and
a reflection layer, provided at a non-display side of the display panel,
wherein the display panel comprises a liquid crystal display panel and a backlight module, the backlight module comprises a metal reflection plate, and the reflection layer is the metal reflection plate; or
the display panel comprises an organic light-emitting diode display panel, and the reflection layer comprises a metal heat-sink layer of the organic light-emitting diode display panel.

11. The display device according to claim 10, further comprising:
a touch control layer, provided between the antenna layer and the display panel, wherein
the touch control layer is insulated from the antenna layer.

12. A display device, comprising:
a display panel,
an antenna layer, comprising at least one antenna unit, wherein the at least one antenna unit comprises a radiation main body, at least one feed line which is electrically connected with the radiation main body, and a plurality of grounding portions; the radiation main body, the at least one feed line, and the plurality of grounding portions are provided in a same layer, and the at least one antenna unit is provided at a display side of the display panel; and
a reflection layer, provided at a non-display side of the display panel,
wherein the display panel comprises a liquid crystal display panel and a backlight module, the backlight module comprises a metal reflection plate, and the reflection layer is the metal reflection plate; or the display panel comprises an organic light-emitting diode display panel, and the reflection layer comprises a metal heat-sink layer of the organic light-emitting diode display panel;
the display panel comprises a display region and a non-display region, and at least part of the at least one antenna unit is provided in the non-display region of the display panel,
a radiation main body of the at least one of antenna unit comprises an antenna radiation portion, at least one feed line of the at least one antenna unit comprises a feed portion, and each of the plurality of the grounding portions of the at least one antenna unit comprises a reference signal pattern portion, and
the antenna radiation portion, the feed portion, and the reference signal pattern portion are provided in the display region of the display panel.

13. The display device according to claim 10, wherein the at least one antenna unit comprises a plurality of the antenna units, and at least one of four edges of the display device is provided with the at least one antenna unit, respectively.

14. The display device according to claim 13, wherein the four edges of the display device comprise a first edge, a second edge opposite to the first edge, a third edge, and a fourth edge opposite to the third edge,
the antenna unit comprises at least one selected from the group consisting of following:
a first antenna array, provided at the first edge;
a second antenna array, provided at the second edge
a third antenna array, provided at the third edge; and
a fourth antenna array, provided at the fourth edge.

15. The display device according to claim 10, further comprising:
a flexible substrate, wherein the antenna layer being is provided on the flexible substrate.

16. A manufacturing method of an antenna unit, comprising:
providing a flexible substrate;
forming a metal layer on the flexible substrate, and etching the metal layer to form an antenna comprising a radiation main body, at least one feed line and a plurality of grounding portions, and
forming an adhesive protection layer on a side of the antenna away from a display panel,
wherein the at least one feed line comprises a first feed line and a second feed line, and the antenna unit comprises a dual-polarized antenna; the first feed line is located at a first side of the radiation main body and electrically connected with the radiation main body, and the second feed line is located at a second side of the radiation main body and electrically connected with the radiation main body;
the plurality of grounding portions comprise a first grounding portion, a second grounding portion, a third grounding portion, and a fourth grounding portion, wherein the first grounding portion and the second grounding portion are respectively located at both sides of the first feed line, and the third grounding portion and the fourth grounding portion are respectively located at both sides of the second feed line;
the first feed line comprises a first section and a second section, the first section is close to the radiation main body, the second section is electrically connected with the first section, the first section is electrically connected with the radiation main body, and the second section extends from the first section between the first grounding portion and the second grounding portion;
the second feed line comprises a third section and a fourth section, the third section is close to the radiation main body, and the fourth section is electrically connected with the third section, the third section is electrically connected with the radiation main body, and the fourth section extends from the third section between the third grounding portion and the fourth grounding portion,
the radiation main body has a symmetrical contour, the first section and the third section are symmetrical with respect to a symmetry axis of the radiation main body, and the second section and the fourth section are unsymmetrical with respect to the symmetry axis of the radiation main body.

17. The manufacturing method according to claim 16, further comprising:
forming a passivation protection layer between the metal layer and the adhesive protection layer.

18. The manufacturing method according to claim 17, further comprising:
forming an antenna insulation layer on a side of the metal layer close to the display panel.

19. The display device according to claim 10, wherein an orthographic projection of the at least one antenna unit on a plane of a light-emitting surface of the display panel is located within an orthographic projection of the reflection layer on the plane of the light-emitting surface of the display panel.

20. The antenna unit according to claim 1, wherein the first grounding portion, the second grounding portion, the third grounding portion, and the fourth grounding portion are arranged along a reference direction, and the symmetry axis of the radiation main body is substantially at 45 degrees with respect to the reference direction.

\* \* \* \* \*